(12) United States Patent
Wild

(10) Patent No.: US 11,032,762 B1
(45) Date of Patent: Jun. 8, 2021

(54) SAVING POWER BY SPOOFING A DEVICE

(71) Applicant: Amazon Technologies, Inc., Seattle, WA (US)

(72) Inventor: Benjamin Wild, Marina Del Rey, CA (US)

(73) Assignee: Amazon Technologies, Inc., Seattle, WA (US)

(*) Notice: Subject to any disclaimer, the term of this patent is extended or adjusted under 35 U.S.C. 154(b) by 183 days.

(21) Appl. No.: 16/134,323

(22) Filed: Sep. 18, 2018

(51) Int. Cl.
| | |
|---|---|
| *H04W 52/02* | (2009.01) |
| *H04W 4/80* | (2018.01) |
| *G08B 13/196* | (2006.01) |
| *H04L 29/08* | (2006.01) |
| *H04L 12/12* | (2006.01) |
| *H04N 7/18* | (2006.01) |

(52) U.S. Cl.
CPC .... *H04W 52/0206* (2013.01); *G08B 13/1961* (2013.01); *G08B 13/19656* (2013.01); *H04L 12/12* (2013.01); *H04L 67/145* (2013.01); *H04W 4/80* (2018.02); *H04W 52/0229* (2013.01); *H04N 7/186* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,247,019 B2* | 1/2016 | Luna | | H04L 67/145 |
| 9,646,180 B2* | 5/2017 | Gordon | | H04L 67/10 |
| 9,717,110 B1* | 7/2017 | Gupta | | H04W 36/03 |
| 10,080,193 B1* | 9/2018 | Bleu-Laine | | H04W 52/0212 |
| 10,404,758 B2* | 9/2019 | Straub | | H04L 65/102 |
| 2003/0128676 A1* | 7/2003 | Lee | | H04L 67/14 370/328 |
| 2008/0151868 A1* | 6/2008 | Kezys | | H04L 12/4641 370/352 |
| 2009/0059899 A1* | 3/2009 | Bendelac | | H04L 12/5692 370/352 |
| 2009/0135751 A1* | 5/2009 | Hodges | | G06F 1/3209 370/311 |
| 2009/0170512 A1* | 7/2009 | Regnier | | H04L 67/14 455/435.1 |
| 2010/0189073 A1* | 7/2010 | Gandham | | H04L 29/12283 370/331 |
| 2011/0055891 A1* | 3/2011 | Rice | | G06F 21/6218 726/2 |

(Continued)

*Primary Examiner* — Yee F Lam
(74) *Attorney, Agent, or Firm* — Greenberg Traurig, LLP

(57) ABSTRACT

A bridge device spoofs a wireless router on behalf of an audio/video recording and communication device (A/V device) to keep a connection with the router active. This prevents the router from dropping the connection with the A/V device. Without the spoofing, the A/V device would have to reestablish a connection which may delay data transmission from the A/V device. The bridge device spoofs the A/V device by sending keepalive messages, which consumes significant power. The A/V device thereby consumes less power because the A/V device does not send keepalive messages while being spoofed by the bridge device. The A/V device and the bridge device communicate over a separate, lower power communication channel, so that the bridge can, for example, tell the A/V device when to wake up and resume communication with the router.

24 Claims, 14 Drawing Sheets

(56) References Cited

U.S. PATENT DOCUMENTS

| | | | |
|---|---|---|---|
| 2012/0173901 A1* | 7/2012 | Soliman | H04W 52/0229 |
| | | | 713/320 |
| 2012/0281699 A1* | 11/2012 | Jia | H04L 69/22 |
| | | | 370/392 |
| 2014/0071885 A1* | 3/2014 | Cherian | H04W 40/22 |
| | | | 370/315 |
| 2014/0282877 A1* | 9/2014 | Mahaffey | H04W 12/08 |
| | | | 726/3 |
| 2014/0321448 A1* | 10/2014 | Backholm | H04L 69/16 |
| | | | 370/338 |
| 2015/0016342 A1* | 1/2015 | Backholm | H04W 24/08 |
| | | | 370/328 |
| 2015/0229608 A1* | 8/2015 | Schulz | H04L 41/0806 |
| | | | 726/14 |
| 2016/0036944 A1* | 2/2016 | Kitchen | H04L 67/12 |
| | | | 709/203 |
| 2016/0337863 A1* | 11/2016 | Robinson | H04W 4/021 |
| 2017/0054594 A1* | 2/2017 | Decenzo | G08B 25/08 |
| 2017/0372055 A1* | 12/2017 | Robinson | G06F 21/35 |
| 2018/0288075 A1* | 10/2018 | Yamane | H04L 43/04 |
| 2019/0052603 A1* | 2/2019 | Wu | H04L 65/1069 |
| 2019/0068721 A1* | 2/2019 | Zhang | H04L 69/165 |
| 2019/0159018 A1* | 5/2019 | Basu Mallick | H04W 4/023 |
| 2019/0166520 A1* | 5/2019 | Luna | H04L 67/2842 |
| 2019/0268800 A1* | 8/2019 | Luna | H04L 67/10 |
| 2019/0286806 A1* | 9/2019 | Robinson | G06F 21/35 |
| 2019/0312843 A1* | 10/2019 | Grimm | H04L 43/10 |

\* cited by examiner

SAVING POWER BY SPOOFING A DEVICE

BACKGROUND

Home security is a concern for many homeowners and renters. Those seeking to protect or monitor their homes often wish to have video and audio communications with visitors, for example, those visiting an external door or entryway. Audio/video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present saving power by spoofing a device now will be discussed in detail with an emphasis on highlighting the advantageous features. These embodiments depict the novel and non-obvious saving power by spoofing a device shown in the accompanying drawings, which are for illustrative purposes only. These drawings include the following figures, in which like numerals indicate like parts.

DETAILED DESCRIPTION

Figure 1:
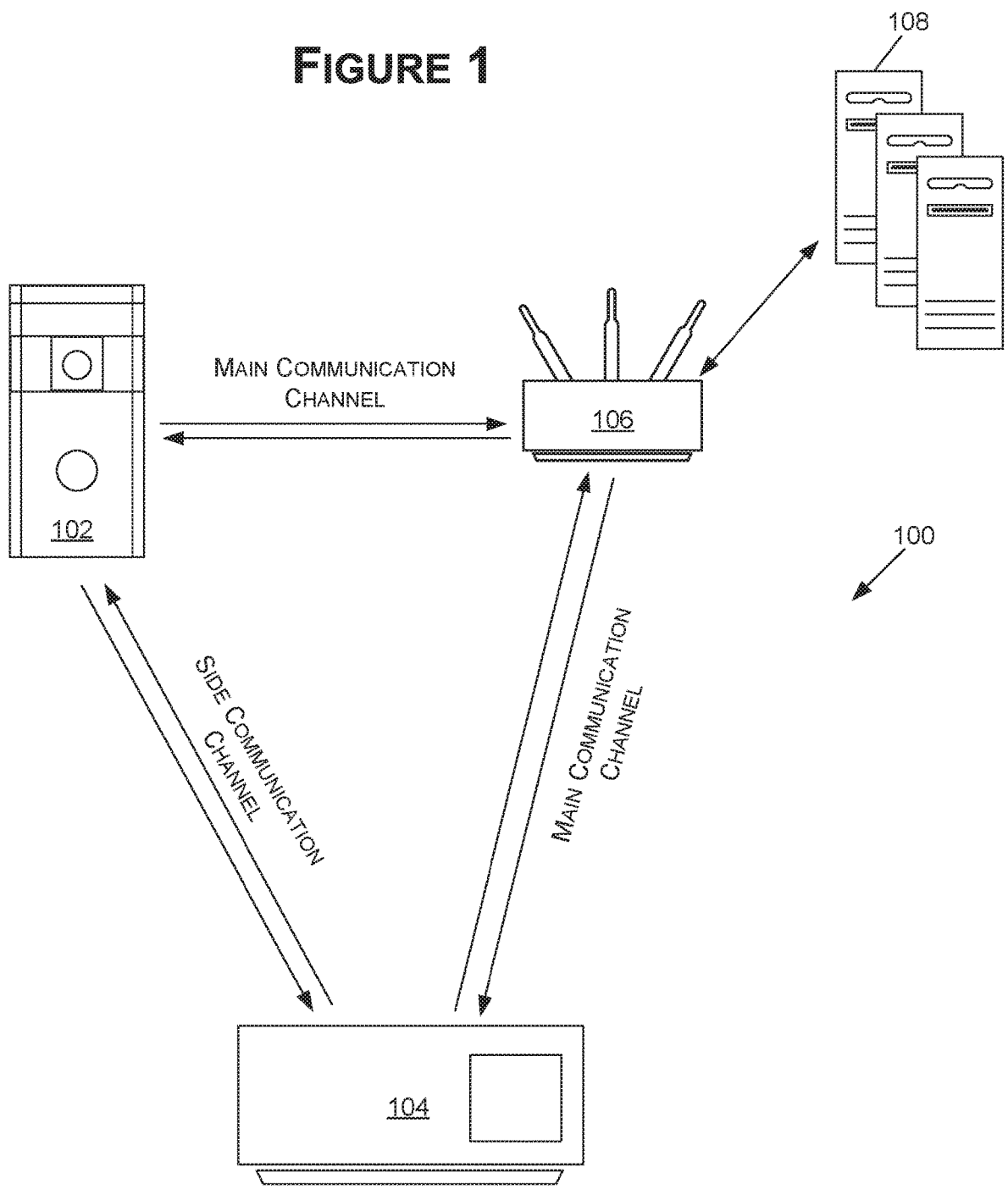
FIG. 1 is a schematic diagram of an example system that includes an A/V recording and communication device that may be spoofed by another device for saving power, according to various aspects of the present disclosure.

The various embodiments of the present saving power by spoofing a device have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

Described herein are embodiments for spoofing a first electronic device (e.g., a battery-powered device) using a second electronic device (e.g., a non-battery power constrained device). When an audio/video (A/V) recording and communication device (also referred to herein as an "A/V device") is not capturing or streaming A/V data, the A/V device may send "keepalive" signals to a Wi-Fi router or other wireless access point ("WAP") to maintain the connection or socket in an active state. In the absence of keepalive messages, the WAP may terminate a connection with an electronic device and, in order to stream A/V data, the A/V device would have to reestablish the connection, which can take several seconds or longer, introducing undesired latency. As a result, maintaining an active connection between the A/V device and the WAP may decrease delays in streaming A/V data captured by the A/V device, thereby reducing latency.

Sending keepalive messages, however, requires power—for some devices, significant amounts of power. As a result, for a battery-powered A/V device, persistent transmission of keepalive messages to maintain a connection with a WAP can increase the frequency of required charging for the battery, which can detrimentally impact the user experience for the A/V device.

To maintain an open wireless connection between an A/V device and a Wi-Fi router while reducing battery drain of the A/V device, a bridge device (e.g., one that is hard-wired for power and thus not constrained by battery capacity and charging) can spoof the A/V device by sending the keepalive messages to the Wi-Fi router, and the A/V device may communicate with the bridge device over a lower power communication channel (which may be referred to herein as a "side communication channel"), which may consume significantly less power than a Wi-Fi communication channel with the router. The A/V device thereby preserves battery power, but the connection between the A/V device and the Wi-Fi router is also maintained. Over the side communication channel, the bridge can, for example, instruct the A/V device when to wake up and resume communication with the Wi-Fi router. Therefore, the A/V device can enter a low-power mode while the bridge device sends keepalive messages, and the bridge device can instruct the A/V device to directly connect to the router when necessary. As just one example, an A/V device listening for a communication from a bridge device over a 900 MHz (megahertz) communication channel may consume about 80 µA, wherein transmitting keepalive messages over a Wi-Fi channel may consume 850 µA. The present embodiments thus can result in significant extension of battery life for the A/V device.

The teachings of the present disclosure may be applied to many types of electronic devices. Accordingly, an A/V device as described herein is just one example of a network-connectable electronic device that may be spoofed as described herein, and a bridge device as described herein is just one example of a network-connectable electronic device that may spoof another device by sending keepalive messages as described herein.

In some embodiments, a network-connected device can send periodic (e.g., every 0.1 seconds, or every 0.15 seconds, or every 0.2 seconds, or every 0.25 seconds, or every 0.3 seconds, or any other interval) keepalive messages to the Wi-Fi router to maintain the connection as active. The keepalive messages may include identification (ID) information associated with the device for which the active connection is to be maintained. The ID information may include, for example, a media access control (MAC) address and/or an internet protocol (IP) address of the device. In various embodiments, the MAC address may never change for a particular device, while the IP address may be assigned to the device and may be changed over time or upon establishment of a new communication channel.

If the device sending the periodic keepalive messages runs on battery power, the sending of the keepalive messages uses battery power, reducing the battery life of the device. For example, an A/V device may consume an average of 850 µA of current over time as it sends keepalive messages every 0.1 seconds. If the A/V device is not transmitting or receiving any messages (e.g., the device is in a hibernation mode), the device may only consume 4 µA of current. Accordingly, the transmission of the keepalive messages consumes much more power than if the device did not transmit any messages. A bridge device that is not battery constrained may therefore be used as described herein to spoof the keepalive messages on behalf of the battery-powered device, allowing the battery-powered device to preserve power while also keeping the connection with the Wi-Fi router open.

When in a hibernate mode, an A/V device may not receive messages over a main communication channel (e.g., a Wi-Fi connection), and thus the A/V device may not be able to receive a wakeup signal to be activated again. Such a wakeup signal may be sent to an A/V device, and the wakeup signal may request or instruct that the A/V device should start capturing and transmitting video data and/or audio data. Therefore, according to the various embodiments described herein, the A/V device may use a side communication channel with a bridge device that is different from the main communication channel (e.g., the Wi-Fi connection with a wireless router), over which the A/V device may receive a wakeup signal. The side communication channel consumes less power for the A/V device to listen for transmitted messages, such as a wakeup signal. As just one example, an A/V device listening for a communication over a 900 MHz (megahertz) side communication channel may consume an average of about 80 µA as compared to an average of 850 µA used to keep a Wi-Fi connection open using a main communication channel. The battery life of the A/V device can therefore be increased by spoofing the A/V device (e.g., sending the keepalive messages) by a non-battery powered device (also referred to herein as a bridge device), the A/V device entering a hibernate mode while spoofed, and providing a side communication channel that consumes less power than maintaining a Wi-Fi connection through which the A/V device and the non-battery powered device can communicate, such as to transmit a wakeup signal from the bridge device to the A/V device.

By spoofing the A/V device as generally described herein, the Wi-Fi connection between the A/V device and the router can be maintained, thereby avoiding the need to reestablish a connection when waking up from a hibernate mode while also preserving the battery life of the A/V device. The A/V device may be said to be operating in a reduced power mode, which may include, in some embodiments, a hibernate mode, a mode in which the A/V device is only monitoring a motion sensor and/or a video sensor, a mode in which the A/V device only responds to a button press of a doorbell button, any other mode that consumes less power than when the A/V device is periodically sending keepalive messages and/or listening for communications from a router, or any combination thereof.

In various embodiments, certain communications may still be made to and/or from the A/V device while the A/V device is in a reduced power mode. Those communications may be made via a side communication channel, while the connection with the Wi-Fi router is considered to be a main communication channel. The side communication channel may consume less power than the main communication channel, especially when the A/V device is merely listening for communications on the side communication channel. In some embodiments described herein, the ID information that is included in keepalive messages includes a MAC address and an IP address. While a MAC address associated with the A/V device may not change, the IP address associated with the A/V device may be periodically reassigned by the router. In such an instance, the router transmits/sends a message for the A/V device that includes the new IP address. The keepalive messages sent by or for the A/V device after the new IP address is assigned should include the new IP address. Accordingly, the bridge device can listen for the new IP address assignment message from the router and update the keepalive messages with the new IP address as necessary. As noted above, the bridge device may also be configured to communicate with the A/V device over the side communication channel. In this way, the bridge device can transmit a message to the A/V device that includes the new IP address so that the A/V device knows the newly assigned IP address for when it resumes communicating with the router. Accordingly, the IP address can be updated with respect to the A/V device without the A/V device needing to listen or communicate over the main communication channel. In addition, a message to resume communication with the router, such as a wakeup signal, can be sent from the bridge device over the side communication channel. Such wakeup signals may, for example, include a request to begin streaming video to the router (and subsequently a client device such as a smart phone).

The ID information of the A/V device (e.g., the MAC address and/or the IP address) may also be sent to the bridge device from the A/V device to initiate the spoofing. The ID information may be sent to the bridge device over the side (lower power) communication channel or the main (higher power) communication channel. In this way, the bridge device receives and has knowledge of the appropriate ID information to include in the keepalive messages to properly spoof the A/V device. In various embodiments, other messages may also be sent between the A/V device and the bridge device, over either the side or main communication channels. For example, the bridge device may send a message to the A/V device indicating that it is able to communicate on the side communication channel, a message to indicate that it is able to spoof the A/V device (e.g., send keepalive messages that include the ID information), or any other message. As further examples, the A/V device may send a message to the bridge device that instructs the bridge device to begin spoofing immediately, a message that instructs the bridge device to begin spoofing after a predetermined period of time, a message that instructs the bridge device to stop spoofing (e.g., if a button is pressed on a video doorbell), or any other message.

According to the embodiments described herein, an A/V device can be spoofed, allowing the A/V device to enter a reduced power mode to extend battery life of the A/V device. The spoofing may be performed by a bridge device that is not battery constrained (e.g., uses hard wired power from an electrical grid). This spoofing can keep open a communication channel with a Wi-Fi router so that the A/V device does not need to reconnect with the router once it exits a reduced power mode and begins communicating with the router again. Advantageously, this spoofing process can occur without any modification to a Wi-Fi router, and without the Wi-Fi router being aware that the spoofing is taking place. That is, the keepalive messages will appear to the Wi-Fi router to have come from the A/V device rather than a bridge device, and the Wi-Fi router will function normally when spoofing occurs.

The remaining detailed description describes the present embodiments with reference to the drawings. In the drawings, reference numbers label elements of the present embodiments. These reference numbers are reproduced below in connection with the discussion of the corresponding drawing features.

FIG. 1 is a schematic diagram of an example system 100 that includes an A/V recording and communication device (A/V device) 102, a bridge device 104, a router 106, and a server 108. The A/V device may be spoofed by another device for saving power, according to various aspects of the present disclosure. In the illustrated system 100, the A/V device 102 communicates with the bridge device 104 over a side communication channel. The A/V device 102 and the bridge device 104 may also communicate over a main communication channel (e.g., a Wi-Fi channel, through the router 106, for example). As described herein, the A/V device 102 may send ID information (e.g., MAC address, IP address, etc.) to the bridge device 104, so that the bridge device 104 can send keepalive messages to the router 106 to keep a connection between the router and the A/V device 102 open. These keepalive messages spoof the A/V device 102, so that, to the router 106, it appears that the A/V device 102 is sending the keepalive messages. In this way, the A/V device 102 does not need to reestablish a communication channel with the router 106 if/when the A/V device 102 resumes communication with the router 106 when resuming normal operation from a low-power mode. This is advantageous, as described herein, because the A/V device 102 may be battery powered. As described herein, sending keepalive messages and listening for communications from the router 106 can consume significant power for a battery powered device. Thus, the spoofing by the bridge device 104 (which may be powered by a hardwired connection to an electrical grid and therefore not reliant on battery power) allows the A/V device 102 to extend its battery life (e.g., the A/V device 102 is using power sending keepalive messages or listening for communications over the main communication channel).

The side communication channel consumes less power for the A/V device 102 to listen for messages than the main communication channel, in an embodiment. Accordingly, when the A/V device 102 is spoofed by the bridge device 104, the A/V device 102 can enter a reduced power mode where it listens for communications over the side communication channel instead of the main communication channel. The side communication channel may be, for example, a 900 MHz radio frequency (RF) channel, a Bluetooth Low Energy (LE) RF channel, a Zigbee RF channel, or any other communication channel that consumes less power than the main communication channel. The main communication channel may be, for example, a Wi-Fi channel.

The router 106 may periodically reassign an IP address associated with the A/V device 102 as described herein. When this reassignment occurs, the reassignment message is transmitted by the router 106 over the main communication channel. While spoofing the A/V device 102, the bridge device 104 also listens for messages transmitted over the main communication channel. Accordingly, the bridge device 104 may receive an IP address reassignment message from the router 106. In this way, the bridge device 104 can continue spoofing the A/V device 102 with keepalive messages that include the updated IP address, and the bridge device 104 can send a message (e.g., over the side communication channel) to the A/V device 102 that indicates the updated IP address. In this way, the A/V device 102 is apprised of the new IP address that the A/V device 102 can use to resume communication with the router 106.

During the time that the A/V device 102 is spoofed by the bridge device 104, the A/V device 102 enters and is in a reduced power mode. The A/V device 102 may exit the reduced power mode in different ways. In an example, a request from a client device (e.g., a smart phone) for live video may be received by the server 108. The server 108 may transmit the request to the router 106 for transmission to the A/V device 102. As described herein, when the A/V device 102 is spoofed, the router 106 (and any other devices on the back end of the router 106, such as the server 108 and the client device) may not be aware that the A/V device is being spoofed by the bridge device 104. Accordingly, the request for live video is transmitted by the router 106, intended for the A/V device 102. However, when the A/V device 102 is in reduced power mode, it is not listening for communications over the main communication channel. The bridge device 104, on the other hand, may be listening for communications over the main communication channel, and may receive the request for live video. The bridge device may then send a wakeup signal to the A/V device 102 over the side communication channel (over which the A/V device 102 is listening). In response to receiving the wakeup signal, the A/V device 102 resumes communicating with the router 106 over the main communication channel, the bridge device 104 stops spoofing the A/V device 102, and the A/V device 102 begins transmitting live video to the router 106 in response to the request. In this example, that live video is subsequently transmitted from the router 106 to the server 108, and then onto the client device that requested the live video. Accordingly, from the perspective of the router 106, the server 108, and the client device, the request for live video was carried out as if the A/V device 102 was always communicating with the router 106 to keep the connection over the main communication channel open. In addition, the request for live video may indicate to the bridge device 104 that it should stop spoofing the A/V device 102, as the A/V device 102 will resume communication with the router 106, either through transmitting of keepalive messages or other data. Accordingly, the bridge device 104 may cease spoofing the A/V device 102 in response to transmitting the request for live video to the A/V device 102.

In another example, the A/V device 102 may initiate an exit of the reduced power mode. For example, the A/V device 102 may include motion sensors and/or video sensors to detect movement, as will be described with respect to FIGS. 3 and 4. When the A/V device 102 detects motion, the A/V device 102 may exit the reduced power mode and resume communications (e.g., with the server 108, a client device, etc.) through the main communication channel and the router 106. The A/V device 102 may then transmit audio, video, and/or other information via the router 106. In another example, the A/V device may exit the reduced power mode in response to a user press of a button on the A/V device 102. In some embodiments, when the A/V device 102 "wakes" from reduced power mode, it may transmit a message to the bridge device 104 to inform the bridge device 104 that it may cease transmission of keepalive messages on behalf of the A/V device 102. The A/V device 102 may transmit the message over the side communication channel or over the main communication channel.

In various embodiments, the A/V device 102 may be a device with a camera, such as a video doorbell, and the bridge device 104 may be a smart home hub device, a doorbell signaling device that is inside a building, a personal assistant device, an alarm system computing device, or some other type of electronic device. In one example, the A/V device 102 is a video doorbell, and the bridge device 104 is a doorbell signaling device. The doorbell signaling device is configured to generate an audio output in response to a signal from the video doorbell that a button of the video doorbell has been pressed. Therefore, as described generally herein, the doorbell signaling device may spoof the video doorbell until the video doorbell wakes up, for example when the button of the video doorbell is pressed.

Figure 2:
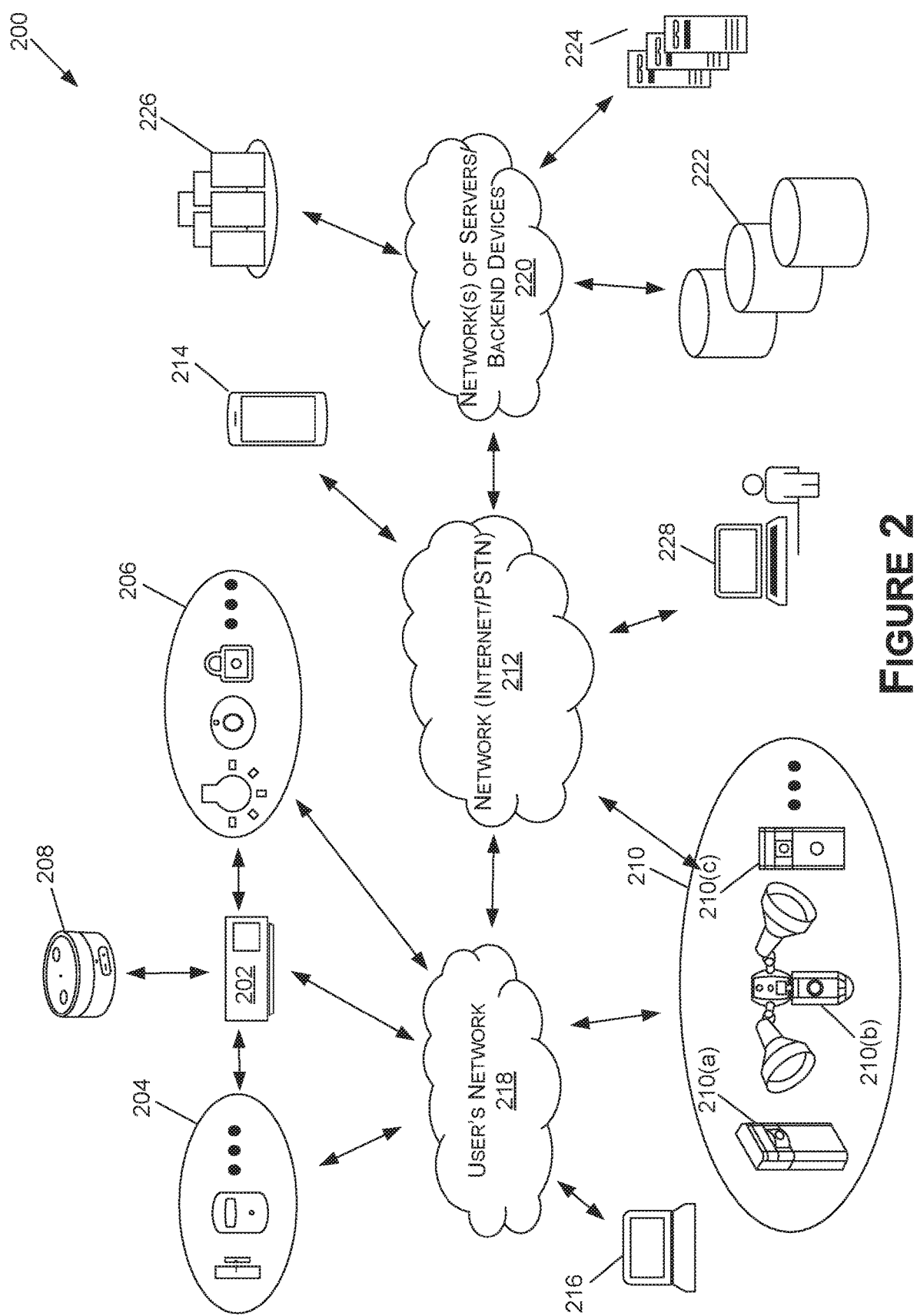
FIG. 2 is a functional block diagram illustrating a system for communicating in a network according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, etc.), when remotely monitored and controlled via a network (Internet/a public switched telephone network (PSTN)) 212 (which may be similar to, and represent the network 112), may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system may be controlled through various user interfaces, such as voice commands and/or a touchscreen. A central hub such as the smart-home hub device 202 and/or the VA device 208 may be used as described herein as a bridge device (non-battery constrained device) that spoofs a battery constrained device (e.g., one of the A/V devices 210) to extend battery life of the battery constrained device. Various examples of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, a 900 MHz low power radio frequency (RF) channel, and/or the like. In various embodiments, one of these communication protocols may be the main communication channel as described with respect to FIG. 1, and another one of these communication channels may be the side communication channel as described with respect to FIG. 1.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN. The user's network 218 may include, for example, a wireless router through which communications are routed. As described herein, certain devices may be spoofed by other devices so that a communication channel with a wireless router of the user's network 218 may be maintained by a non-battery constrained device on behalf of a battery constrained device.

The system 200 may include one or more A/V recording and communication devices 210 (alternatively be referred to herein as "A/V devices 210" or "A/V device 210"). The A/V devices 210 may include security cameras 210(*a*), light cameras 210(*b*) (e.g., floodlight cameras, spotlight cameras, etc.), video doorbells 210(*c*) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3. In various embodiments, various A/V devices 210 may be battery powered, hard wired, or some combination of the two. Accordingly, the A/V devices 210 may be, may represent, and/or may be similar to the bridge device 104 and/or the A/V device 102 of FIG. 1. For example, a connection to a wireless router of the user's network between the wireless router and the A/V devices 210 may be spoofed by another device. In another example, the A/V devices 210 may spoof another device. For example, one of the A/V devices 210 that is connected to a hard wired power source may be considered a non-battery constrained device, and therefore may be used to spoof a battery powered device (including another A/V device 210). Thus, the client A/V devices 210 may be suitable to spoof other devices, or may be spoofed themselves according to the methods and systems described herein.

The system 200 may further include a smart-home hub device 202 (which may alternatively be referred to herein as the "hub device 202") connected to the user's network 218 and/or the network (Internet/PSTN) 212. The smart-home hub device 202 (also known as a home automation hub or gateway device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212. In various embodiments, the hub device 202 may represent, and/or be similar to, the bridge device 104 of FIG. 1.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Silica For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202. In various embodiments, the VA device 208 may represent, and/or be similar to, the bridge device 104 of FIG. 1.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property. In various embodiments, the sensors 204 may represent, and/or be similar to, the A/V device 102 of FIG. 1 (e.g., a connection to a wireless router of the user's network between the wireless router and the sensors 204 may be spoofed by another device).

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell signaling device, a barrier control device (e.g., an automated door hinge), a smart doormat, and/or other automation devices. In various embodiments, the automation devices 206 may represent, and/or be similar to, the A/V device 102 of FIG. 1 (e.g., a connection to a wireless router of the user's network between the wireless router and the automations devices 206 may be spoofed by another device).

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system.

The security system and/or home-automation system may be installed at location, such as a property, home, business, or premises for the purpose of securing and/or automating all or a portion of the location.

The system 200 may further include one or more client devices 214, 216. The client devices 214, 216 may communicate with and/or be associated with (e.g., capable of access to and control of) the A/V devices 210, a smart-home hub device 202, the VA device 208, sensors 204, and/or automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.). In various embodiments, the client devices 214, 216 may represent, and/or be similar to, the A/V device 102 or the bridge device 104 of FIG. 1. For example, a connection to a wireless router of the user's network between the wireless router and the client devices 214, 216 may be spoofed by another device. In another example, the client devices 214, 216 may spoof another device. For example, one of the client devices 214, 216 that is currently plugged into hard wired power may be considered a non-battery constrained device, and therefore may be used to spoof a battery powered device. In various embodiments, even a client device 214, 216 that is not currently plugged in (e.g., charging its battery) may be considered a non-battery constrained device because it is capable of and/or is frequently plugged into hard wired power. Thus, the client devices 214, 216 may be suitable to spoof other devices, or may be spoofed themselves according to the methods and systems described herein.

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more backend servers 224, and one or more backend application programming interfaces (APIs) 226. For example, the server 108 may be similar to the backend servers 224 and/or the other backend devices that are part of the network of servers/backend devices 220. Thus, the connection between the router 106 and the server 108 of FIG. 1 may include any combination of the network 212, the network of servers/backend devices 220, and any of the devices with which the network 212 and the network of servers/backend devices 220 communicate. While FIG. 2 illustrates the storage device 222, the backend server 224, and the backend API 226 as components separate from the network 220, it is to be understood that the storage device 222, the backend server 224, and/or the backend API 226 may be considered to be components of the network 220. For example, the network 220 may include a data center with a plurality of computing resources used to implement the storage device 222, the backend server 224, and the backend API 226.

The backend server 224 may comprise a computer program or other computer executable code that, when executed by processor(s) of the backend server 224, causes the backend server 224 to wait for requests from other computer systems or software (clients) and provide responses. In an embodiment, the backend server 224 shares data and/or hardware and/or software resources among the client devices 214, 216. This architecture is called the client-server model. The client devices 214, 216 may run on the same computer or may connect to the backend server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various embodiments, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend servers 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control their own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

Figure 3:
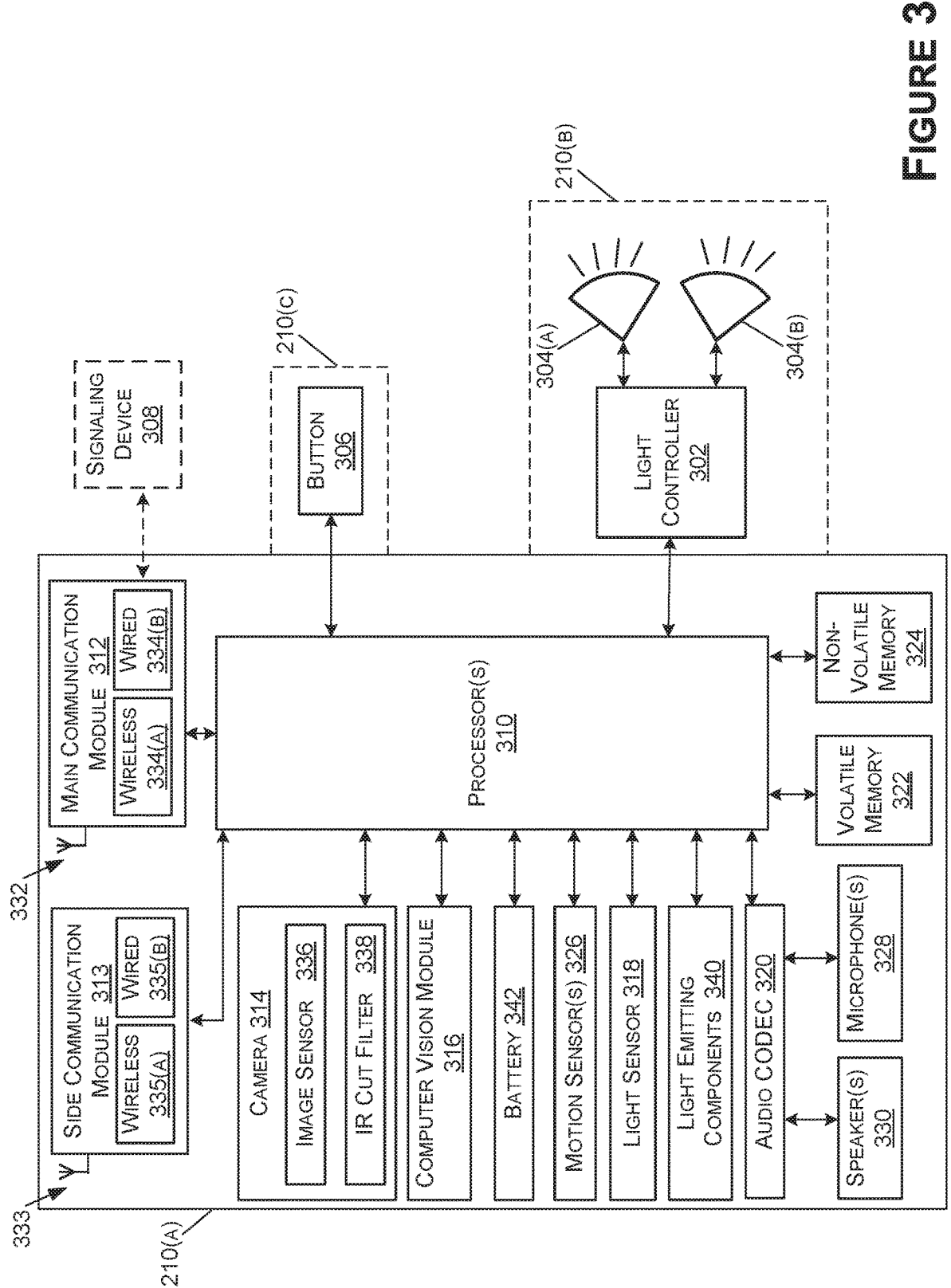
FIG. 3 is a functional block diagram of an A/V recording and communication device according to various aspects of the present disclosure.

FIG. 3 is a functional block diagram for an audio/video (A/V) device according to various aspects of the present disclosure. In some embodiments, the one or more A/V devices 210 may include the security camera 210(*a*). In other embodiments, the one or more A/V devices 210 may include the light camera 210(*b*), which may include some or all of the components of the security camera 210(*a*) in addition to a light controller 302 and one or more lights 304(*a*), 304(*b*). In some embodiments, the one or more A/V devices 210 may include the video doorbell 210(*c*), which may include some or all of the components of the security camera 210(*a*) in addition to a button 306, and in some embodiments, a connection to a signaling device 308 (e.g., a pre-installed signaling device, such as a wired signaling device, and/or a wireless signaling device, connected over Wi-Fi, BLE, or the another wireless communication protocol).

With further reference to FIG. 3, the A/V device 210 may include a processor(s) 310, a main communication module 312, a side communication module 313, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller") may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, the main communication module 312, and/or the side communication module 313, and may perform various functions as described in the present disclosure. In various embodiments, when the processor(s) 310 is triggered by the motion sensor(s) 326, the camera 314, the speaker(s) 330, the microphone(s) 328, the main communication module 312, the side communication module 313, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication modules 312/313 and the camera 314.

With further reference to FIG. 3, the main communication module 312 may comprise an integrated circuit including a processor core, memory, and programmable input/output peripherals. The main communication module 312 may be used to communicate over a main communication channel as shown in FIG. 1 (e.g., between the A/V device 102, the router 106, and the bridge device 104). The main communication module 312 may be operatively connected to the processor(s) 310. In some embodiments, the main communication module 312 is configured to handle communication links between the A/V device 210 and other, external devices, external receivers, external transmitters, and/or external transceivers, and to route incoming/outgoing data appropriately. For example, inbound data from an antenna 332 of the main communication module 312 may be routed through the main communication module 312 before being directed to the processor(s) 310, and outbound data from the processor(s) 310 may be routed through the main communication module 312 before being directed to the antenna 332 of the main communication module 312. As another example, the main communication module 312 may be configured to transmit data to and/or receive data from a remote network device (e.g., one or more components of the network(s) of servers/backend devices 220 described in FIG. 2). The main communication module 312 may include wireless 334(*a*) and/or wired 334(*b*) adapters. For example, the main communication module 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), a 900 MHz low power radio frequency (RF) channel, and/or satellite networks. The main communication module 312 may receive inputs, such as power and/or data, from the camera 314, the processor(s) 310, the button 306 (in embodiments where the A/V device 210 is the video doorbell 210(*c*)), the motion sensors 326, a reset button (not shown in FIG. 3 for simplicity), and/or the non-volatile memory 324. The main communication module 312 may also include the capability of communicating over wired connections, such as with a signaling device 308. For example, when the button 306 of the video doorbell 210(*c*) is pressed, the main communication module 312 may be triggered to perform one or more functions, such as to transmit a signal over the wired 334(*b*) connection to the signaling device 308 (although, in some embodiments, the signal be transmitted over a wireless 334(*a*) connection to the signaling device) to cause the signaling device 308 to emit a sound (e.g., a doorbell tone, a user customized sound, a ringtone, a seasonal ringtone, etc.). The main communication module 312 may also act as a conduit for data communicated between various components and the processor(s) 310.

With further reference to FIG. 3, the side communication module 313 may comprise an integrated circuit including a processor core, memory, and programmable input/output peripherals. As described herein, the side communication module 313 may consume less power than the main communication module 312. In this way, the A/V device 210 can communicate over the side communication module 313 while preserving battery life as compared to communicating over, listening over, and/or sending keepalive messages over the main communication module 312 as described herein. The side communication module 313 may be used to communicate over a side communication channel, as shown in FIG. 1 (e.g., between the A/V device 102 and the bridge device 104). The side communication module 313 may be operatively connected to the processor(s) 310. In some embodiments, the side communication module 313 is configured to handle communication links between the A/V device 210 and other, external devices, external receivers, external transmitters, and/or external transceivers, and to route incoming/outgoing data appropriately. For example, inbound data from an antenna 333 of the side communication module 313 may be routed through the side communication module 313 before being directed to the processor(s) 310, and outbound data from the processor(s) 310 may be routed through the side communication module 313 before being directed to the antenna 333 of the side communication module 313. As another example, the side communication module 313 may be configured to transmit data to and/or receive data from a remote network device (e.g., one or more components of the network(s) of servers/backend devices 220 described in FIG. 2). The side communication module 313 may include wireless 335(*a*) and/or wired 335(*b*) adapters. For example, the side communication module 313 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The side communication module 313 may receive inputs, such as power and/or data, from the camera 314, the processor(s) 310, the button 306 (in embodiments where the A/V device 210 is the video doorbell 210(*c*)), the motion sensors 326, a reset button (not shown in FIG. 3 for simplicity), and/or the non-volatile memory 324. The side communication module 313 may also include the capability of communicating over wired connections, such as with a signaling device 308 (connection with the signaling device 308 not shown for simplicity). For example, when the button 306 of the video doorbell 210(*c*) is pressed, the side communication module 313 may be triggered to perform one or more functions, such as to transmit a signal over the wired 335(*b*) connection to the signaling device 308 (although, in some embodiments, the signal may be transmitted over a wireless 335(*a*) connection to the signaling device) to cause the signaling device 308 to emit a sound (e.g., a doorbell tone, a user customized sound, a ringtone, a seasonal ringtone, etc.). The side communication module 313 may also act as a conduit for data communicated between various components and the processor(s) 310.

Accordingly, the A/V device 210 is equipped with both the main communication module 312 and the side communication module 313, in embodiments. As described herein, the side communication module 313 may consume less power than the main communication module 312. Accordingly, when the A/V device 210 is in a reduced power mode, the A/V device 210 can cease communicating or listening for communications with the main communication module 312. The A/V device 210 instead may only listen with the side communication module 313, as described herein, to consume less power and extend battery life of the battery 342.

In various embodiments, a bridge device (e.g., the smart hub 202, a different A/V device 210, the client device 214, 216, the VA device 208, etc.) is also equipped with both a main communication module similar to the main communication module 312 and a side communication module similar to the side communication module 313. In this way, the bridge device may communicate over both of the main and side communication channels. As described herein, the bridge device may send keepalive messages to a router over the main communication channel, and communicate with a battery constrained device (e.g., the A/V device 210) over the side communication channel using the side communication module. In other words, any device that is spoofed or is doing the spoofing may be equipped with both the main and side channel communication modules.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 720p, 1080p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the main communication module 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 229 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the recording and communication A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the main communication module 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the main communication module 312 to the network 212 via the user's network 218, routed by the backend server 224 and/or the backend API 226 and delivered to the client device(s) 214, 216 as described above in connection with FIG. 2. When the user speaks, after being transferred through the network 212, the user's network 218, and the main communication module 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power (alternatively referred to herein as being powered by a hard wired connection), such as a household AC power supply (alternatively referred to herein as "AC mains" or "wall power"). As described herein, an A/C device may therefore be a battery constrained or non-battery constrained, and therefore may act as a bridge device that spoofs a battery constrained device or may itself be spoofed. The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not be connected to a source of AC power. When the battery 342 is depleted of its charge, it may be recharged, such as by connecting a power source to the battery 342 (e.g., using a USB connector). In instances where a device is supplied by both battery power and AC power, the device may serve as a bridge device to spoof other devices as described herein, and/or may be spoofed itself. Whether the devices is spoofed or spoofs other devices may depend on a battery power level and/or the sufficiency of the AC power.

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

In various embodiments described herein, the sensing of motion (e.g., by the motion sensor(s) 326 and/or the camera 314) or recognition of an object, person, etc. (e.g., by the CVM 316) using any of the methods described herein may cause the A/V device 210 to exit a reduced power mode and resume communicating with a router over a main communication channel. Upon exiting the reduced power mode, the A/V device 210 may send a message to a bridge device to cease spoofing (e.g., sending keepalive messages on behalf of) the A/V device 210 as described herein.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motions sensor(s) 326 and/or the camera 314 detecting motion, the light controller 236 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(c), the A/V device 210 may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the main communication module 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the main communication module 312, to the client device(s) 214, 216 to indicate to the user(s) of the client device(s) 214, 216 that a person is present at the A/V device 210 (in some embodiments, via at least one of the hub device 202, the VA device 208, and/or one or more component of the network of servers/backend devices 220).

In various embodiments described herein, the pressing of the button 306 (or any other input) may cause the A/V device 210 to exit a reduced power mode and resume communicating with a router. Upon exiting the reduced power mode, the A/V device 210 may send a message to a bridge device to cease spoofing (e.g., sending keepalive messages on behalf of) the A/V device 210 as described herein.

Although the A/V recording and communication device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 4:
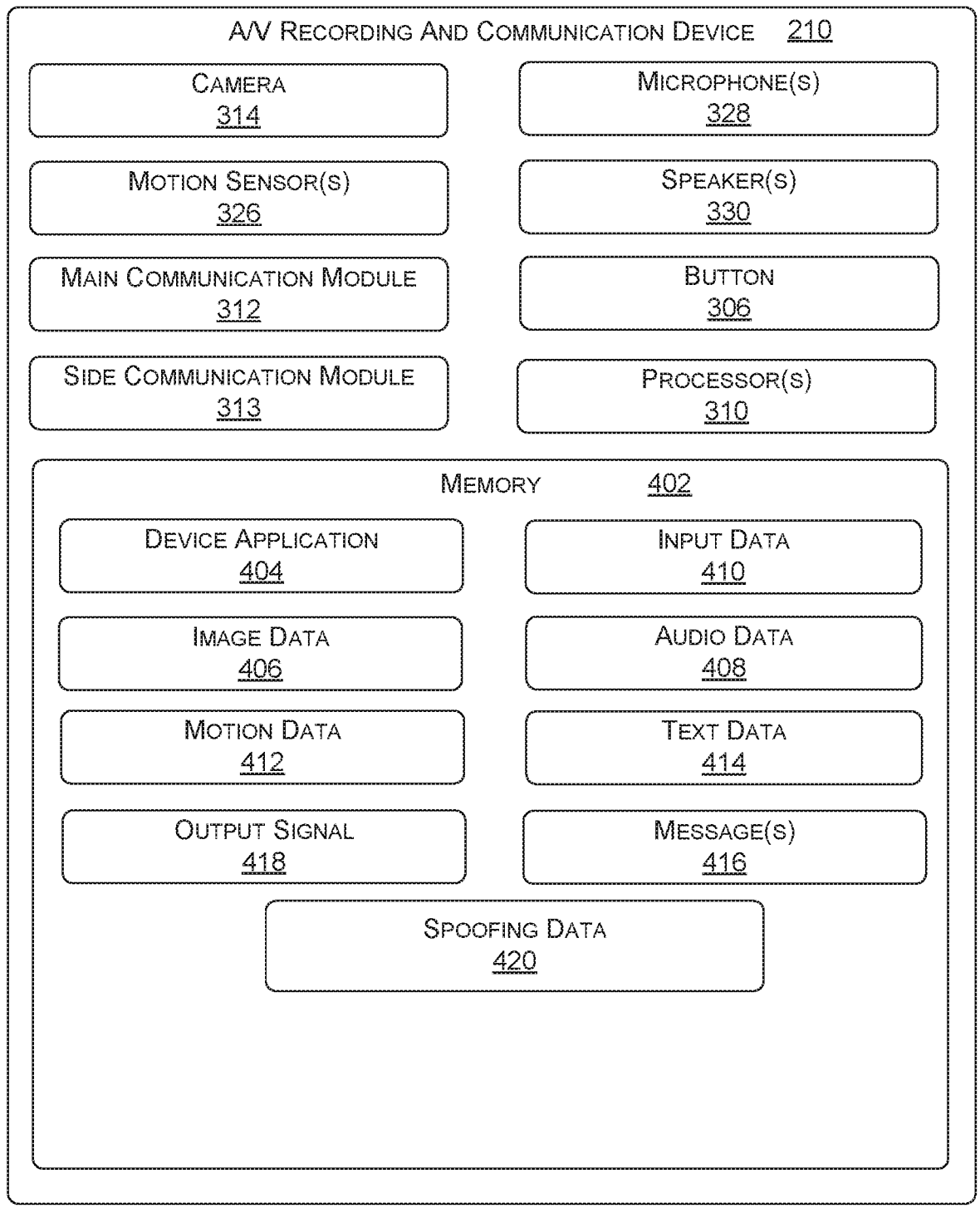
FIG. 4 is a functional block diagram illustrating one example embodiment of an A/V recording and communication device according to various aspects of the present disclosure.

FIG. 4 is another functional block diagram illustrating an embodiment of the A/V device 210 according to various aspects of the present disclosure. In some embodiments, the A/V device 210 may represent, and further include one or more of the components from, the A/V recording and communication doorbell 210(*c*), the A/V recording and communication security camera 210(*a*), and/or the floodlight controller 210(*b*). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may configure the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

In addition, the device application 404 may configure the processor(s) 310 to transmit the image data 406, the audio data 408, the motion data 412, the input data 410, the text data 414, and/or message(s) 416 to the client devices 214, 216, the hub device 202, and/or the backend server 224 using the main communication module 312. In various embodiments, the device application 404 may also configure the processor(s) 310 to generate and transmit an output signal 418 that may include the image data 406, the audio data 408, the text data 414, the input data 410, and/or the motion data 412. In some of the present embodiments, the output signal 418 may be transmitted to the backend server 224 and/or the hub device 202 using the main communication module 312. The backend server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the backend server 224, and the backend server 224 may then transmit (or forward) the output signal 418 to the client device(s) 214, 216. In other embodiments, the output signal 418 may be transmitted directly to the client device(s) 214, 216 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(*c*)), the A/V device 210 may not include the button 306, and the A/V device 210 may not generate the input data 410.

With further reference to FIG. 4, a message 416 may be generated by the processor(s) 310 and transmitted, using the main communication module 312, to the client device 214, 216, the backend server 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia messages (MMS), voicemail messages, video signals, audio signals, data transmissions, and/or any other type of electronic communication that an electronic device can send to another electronic device.

The image data 406, the audio data 408, the text data 414, and/or the motion data 412 may be tagged with (e.g., a time stamp, based on clock data) and/or stored separately (e.g., on the backend server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the backend server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

The A/V device 210 also includes the side communication module 313. The side communication module 313 may be used as described herein to communicate over a side communication channel. The messages 416 may be sent over the side communication channel using the side communication module 313. Some of the messages 416 may include messages and data therein that allow the A/V device 210 to be spoofed. For example, the messages 416 may include ID information (e.g., MAC address, IP address) so that the A/V device 210 can be spoofed, an instruction to a bridge device to begin spoofing the A/V device 210, an instruction to a bridge device to stop spoofing the A/V device 210, or any other type of message.

Some of the messages 416 may also include messages and data therein that allow the A/V device 210 to spoof another, battery constrained device. For example, the messages 416 may include an indication to a battery constrained device that the A/V device 210 is beginning to spoof the battery constrained device, an indication to a battery constrained device that the A/V device 210 is ceasing to spoof the battery constrained device, a wakeup signal, an instruction to go into reduced power mode, updated ID information (e.g., a new IP address), or any other type of message.

The memory 402 also includes spoofing data 420. The spoofing data 420 may include information about spoofing another device and/or information for spoofing the A/V device 420. For example, the spoofing data 420 may include the ID information (e.g., the MAC address and/or the IP address) of a device being spoofed (either the A/V device 210 or another device). The spoofing data 420 may also include instructions for how to communicate over the side communication channel using the side communication module 313 (e.g., message formats, listening intervals, etc.). Accordingly, the A/V device 210 may therefore be used as a bridge device or may be spoofed by a separate bridge device as described herein.

Figure 5:
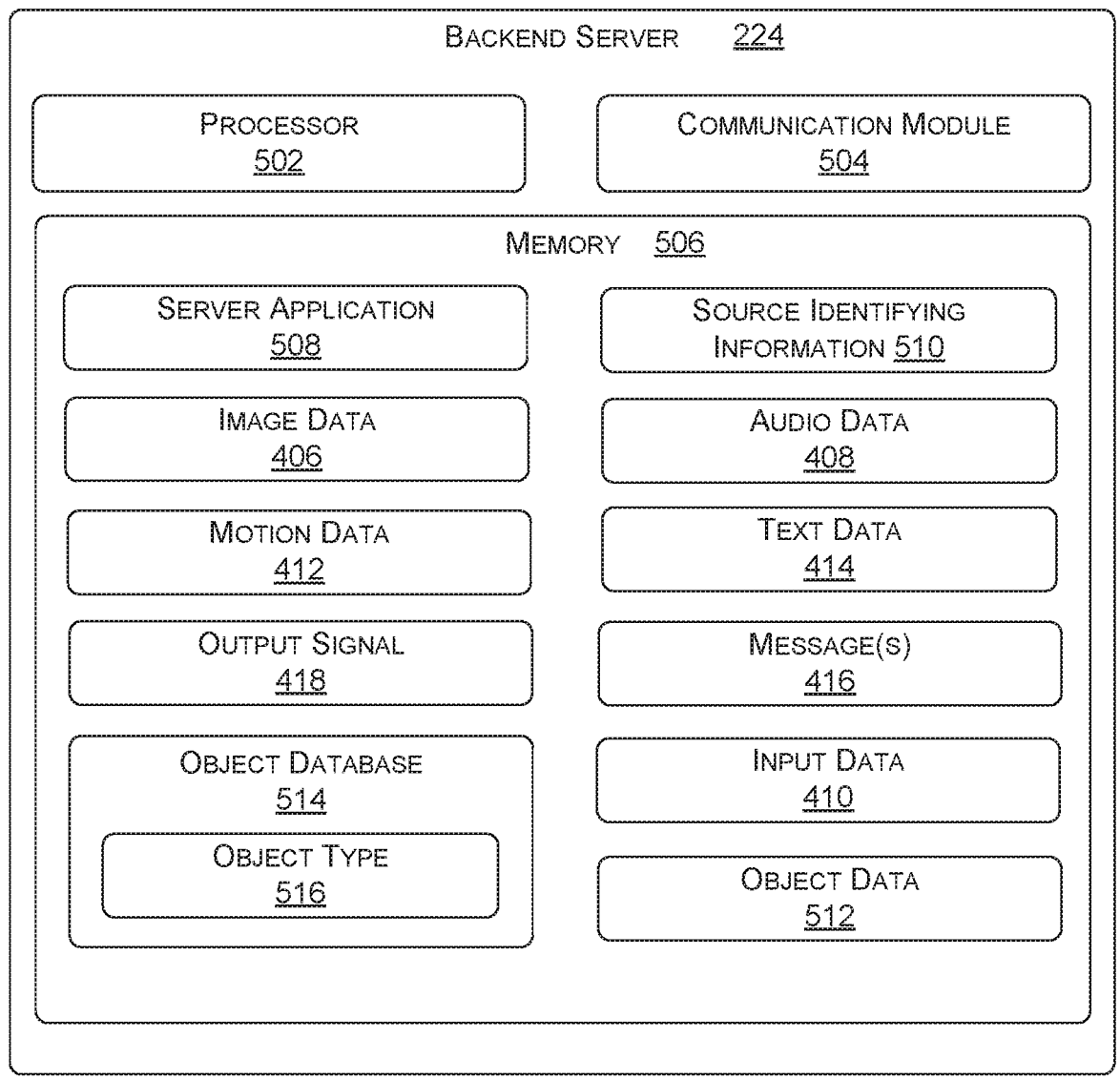
FIG. 5 is a functional block diagram illustrating one example embodiment of a backend device according to various aspects of the present disclosure.

FIG. 5 is a functional block diagram illustrating one embodiment of the backend server 224 according to various aspects of the present disclosure. The backend server 224 may comprise processor(s) 502 (which may be similar to, and/or include similar functionality as, the processor(s) 310), a communication module 504 (which may be similar to, and/or include similar functionality as, the main communication module 312), and a memory 506 (which may be similar to, and/or include similar functionality as, the memory 402). The communication module 504 may allow the backend server 224 to access and communicate with devices connected to the network (Internet/PSTN) 212 (e.g., the A/V device 210, the hub device 202, the client devices 214, 216, a device controlled by the security monitoring service 228, the A/V devices 230, and/or the client devices 232).

The memory 402 may include a server application 508 that configures the processor(s) 502 to receive and/or retrieve the audio data 408, the text data 414, the input data 410, the messages 416, the image data 406, and/or the motion data 412 from the A/V device 210 (e.g., in the output signal 418) and/or the hub device 202. The server application 508 may also configure the processor(s) 502 to transmit (and/or forward) the audio data 408, the text data 414, the input data 410, the messages 416, the image data 406, and/or the motion data 412 to the client devices 214, 216 using the communication module 504. Furthermore, the server application 508 may configure the processor(s) 502 to receive, using the communication module 504, image data 512 (also referred to as "second image data 512") generated by the A/V devices 230.

Although referred to as the backend server 224 with reference to the processes described herein, the backend server 224 may additionally, or alternatively, include one or more of the devices from the network(s) of servers/backend devices 220. For example, the processes described herein with respect to the backend server 224 may additionally, or alternatively, at least in part, be performed by one or more backend APIs 226.

In further reference to FIG. 5, the memory 506 may also include source identifying data 510 that may be used to identify the A/V device 210, the hub device 202, and/or the client devices 214, 216. In addition, the source identifying data 510 may be used by the processor(s) 502 of the backend server 224 to determine the client devices 214, 216 are associated with the A/V device 210 and/or the hub device 202.

In some embodiments, the server application 508 may further configure the processor(s) 502 to generate and transmit a report signal (not shown) to a third-party client device (e.g., electronic device(s) 234), which may be associated with a law enforcement agency or the security monitoring service 228, for example. The report signal, which may be the message 416, in some examples, may include the image data 406, the audio data 408, the text data 414, and/or the second image data 512. As described herein, at least some of the processes of the A/V device 210, the hub device 202, and/or the client device 214, 216 may be executed by the backend server 224.

For example, the server application 508 may configure the processor(s) 502 to analyze the image data 406 in order to determine if the image data 406 depicts an object. Objects may include, but are not limited to, people, animals, vehicles, parcels (e.g., packages), electronic devices (e.g., remote control vehicles, drones, etc.), and/or any other type of object that can be depicted by the image data 406 and/or cause motion that can be detected by the A/V device 210. In some examples, the processor(s) 502 of the backend server 224 may analyze the image data 406 whenever the backend server 224 receives the image data 406 from the A/V device 210.

In some examples, to analyze the image data 406, computer vision processing and/or image processing, as described herein, for example, may be performed by the processor(s) 502 of the backend server 224 to determine that the image data 406 depicts one or more objects. For example, in any of the present embodiments, the image data 406 generated by the A/V device 210 may be analyzed to determine object data 512. In some of the present embodiments, one or more of the image data 406, the motion data 412, and the audio data 408 may be used to determine the object data 512. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or super-quadrics, for example.

In some embodiments, the processor(s) 502 of the backend server 224 may compare the object data 512 to an object database 514 to determine what, if any, object(s) the image data 406 depicts in the field of view of the A/V device 210. For example, the object database 514 may store image data corresponding to images and/or video footage that depict various objects, where the image data may be labeled (e.g., tagged, such as in the form of metadata) to indicate an object type 516 (alternatively referred to herein as the "type of object 516") depicted by each image and/or video footage. For a first example, the object database 514 may store image data depicting a person, where the image data is labeled to indicate that the type of object 516 includes a person. For a second example, the object database 514 may store image data depicting an animal (e.g., a dog, a cat, a coyote, etc.), where the image data is labeled to indicate that the type of object 516 includes the animal (e.g., the dog, the cat, the coyote, etc.). For a third example, the object database 514 may store image data depicting a vehicle, where the image data is labeled to indicate the type of object 516 includes the vehicle.

Based on the comparing, the processor(s) 502 of the backend server 224 may match the object data 512 from the image data 406 to the image data stored in the object database 514. The processor(s) 502 of the backend server 224 may then use the match to determine that the object data 512 represents an object and/or to determine the type of object 516 that the object data 512 represents. For example, if the processor(s) 502 of the backend server 224 matches the object data 512 from the image data 406 to image data stored in the object database 514 that represents a person, then the processor(s) 502 of the backend server 224 may determine that the image data 406 depicts an object and/or that the image data 406 depicts a person. In some examples, when the object data 512 represents multiple objects, the processor(s) 502 of the backend server 224 may perform a similar analysis to identify each object represented by the object data 512 and/or the respective type of object 516 associated with each of the objects represented by the object data 512.

In some examples, in addition to, or alternatively from, comparing the image data 406 to the image data stored in the object database 514, features and/or characteristics of various objects may be stored in the object database 514, and the features and/or characteristics of the objects in the image data 406 may be determined (e.g., using computer vision processing, image processing, or the like) and compared against the features and/or characteristics from the object database 514. For example, sizes, volumes, weights, colors, movement types, and/or other features and/or characteristics of various objects may be stored in the object database 514. The size, volume, weight, color, movement type, and/or other features and/or characteristics of an object depicted by the image data 406 may then be compared to the sizes, volumes, weights, colors, movement types, and/or other features and/or characteristics stored in the object database 514 to identify the type of object 516 depicted by the image data 406.

Although described as being performed in the backend server 224, in some embodiments, the image data 406 may be analyzed by any of the A/V recording and communication device 210, the hub device 202, and/or the client device 214/216, in order to determine if the image data 406 depicts an object, therein. Thus, any or all of the operations described herein to analyze the image data 406 may be performed by any of these devices. To perform these operations, any or all of these devices may also include the object database 514, including the object type 516, and/or the object data 514, as described with reference to FIG. 5.

Figure 6:
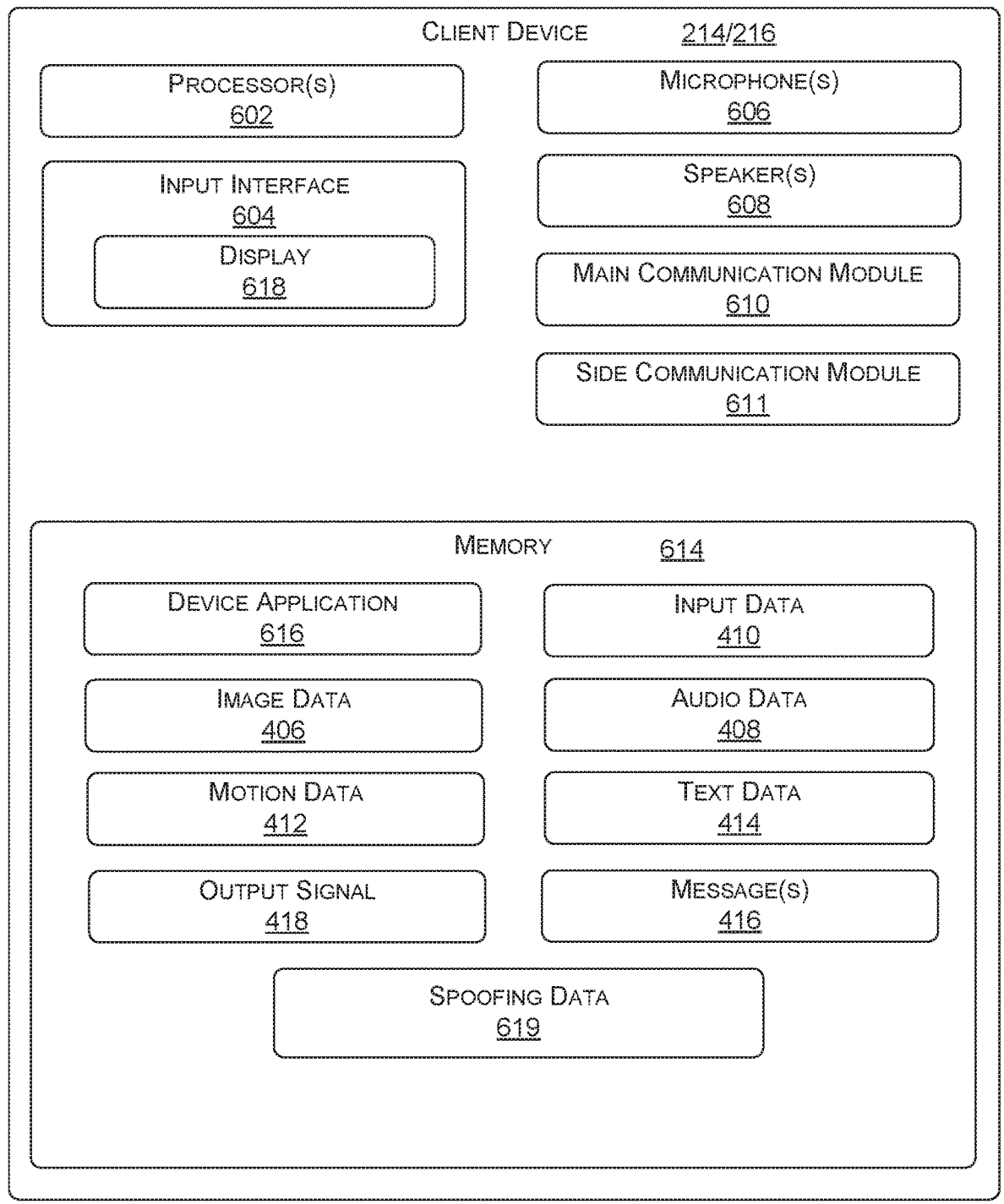
FIG. 6 is a functional block diagram illustrating one example embodiment of a client device according to various aspects of the present disclosure.

FIG. 6 is a functional block diagram illustrating one embodiment of the client device 214, 216, according to various aspects of the present disclosure. The client device 214, 216 may comprise processor(s) 602 (which may be similar to, and/or include similar functionality as, the processor(s) 310) that are operatively connected to an input interface 604, microphone(s) 606, speaker(s) 608, a main communication module 610 (which may be similar to, and/or include similar functionality as, the main communication module 312), and memory 612 (which may be similar to, and/or include similar functionality as, the memory 402). The client device 214, 216 may further comprise a camera (not shown) operatively connected to the processor(s) 602.

The memory 612 may store a device application 614. In various embodiments, the device application 614 may configure the processor(s) 602 to receive input(s) to the input interface 604 (e.g., receive a request for audio and/or video data from an A/V device 210). In addition, the device application 614 may configure the processor(s) 602 to receive, using the main communication module 610, the input data 410, the image data 406, the audio data 408, the output signal 418, and/or messages 416 from one or more of the A/V device 210, the hub device 202, or the backend server 224.

With further reference to FIG. 6, the input interface 604 may include a display 618. The display 618 may include a touchscreen, such that the user of the client device 214, 216 may provide inputs directly to the display 618 (e.g., receive a request for audio and/or video data from an A/V device 210). In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 614 may configure the processor(s) 602 to cause the display 618 to display the message 416. The message 416 may indicate that the A/V device 210 detected motion, detected the presence of an object, received an input (e.g., to the button 306), etc. While displaying the message 416, the input interface 604 may receive input from the user to answer the message 416. In response, the device application 614 may configure the processor(s) 602 to display the received image data 406 on the display 618 (e.g., display image(s) and/or video footage represented by the image data 406).

The client device 214, 216 may also include a side communication module 611. The side communication module 611 may be used as described herein to communicate over a side communication channel. The messages 416 may be sent over the side communication channel using the side communication module 611. Some of the messages 416 may include, for example, an instruction to a bridge device to stop spoofing the client device 214, 216, an instruction to a bridge device to begin spoofing the client device 214, 216, an indication to a battery constrained device that the client device 214, 216 is beginning to spoof the battery constrained device, an indication to a battery constrained device that the client device 214, 216 is ceasing to spoof the battery constrained device, a wakeup signal, an instruction to go into reduced power mode, ID information (e.g., MAC address, IP address), updated ID information (e.g., a new IP address), or any other type of message. The memory 614 also includes spoofing data 619. The spoofing data 619 may include information about spoofing another device and/or information for spoofing the client device 214, 216. For example, the spoofing data 619 may include the ID information (e.g., the MAC address and/or the IP address) of a device being spoofed (either the client device 214, 216 or another device). The spoofing data 619 may also include instructions for how to communicate over the side communication channel using the side communication module 611 (e.g., message formats, listening intervals, etc.). Accordingly, the client device 214, 216 may therefore be used as a bridge device or may be spoofed by a separate bridge device as described herein. In various embodiments, the client device 214, 216 may also be used by a user to request audio and/or video data from an A/V device 210 that is being spoofed. For example, a user may request via an interface on their client device 214, 216 to see video captured by the A/V device 210. Such a request can be routed through a router and a bridge device as described herein. A wakeup signal is sent to the A/V device 210 being spoofed, and the bridge device ceases spoofing the A/V device 210 so that the A/V device 210 can resume communicating with the client device 214, 216 via the router and transmit the requested audio and/or video data to the client device 214, 216.

Figure 7:
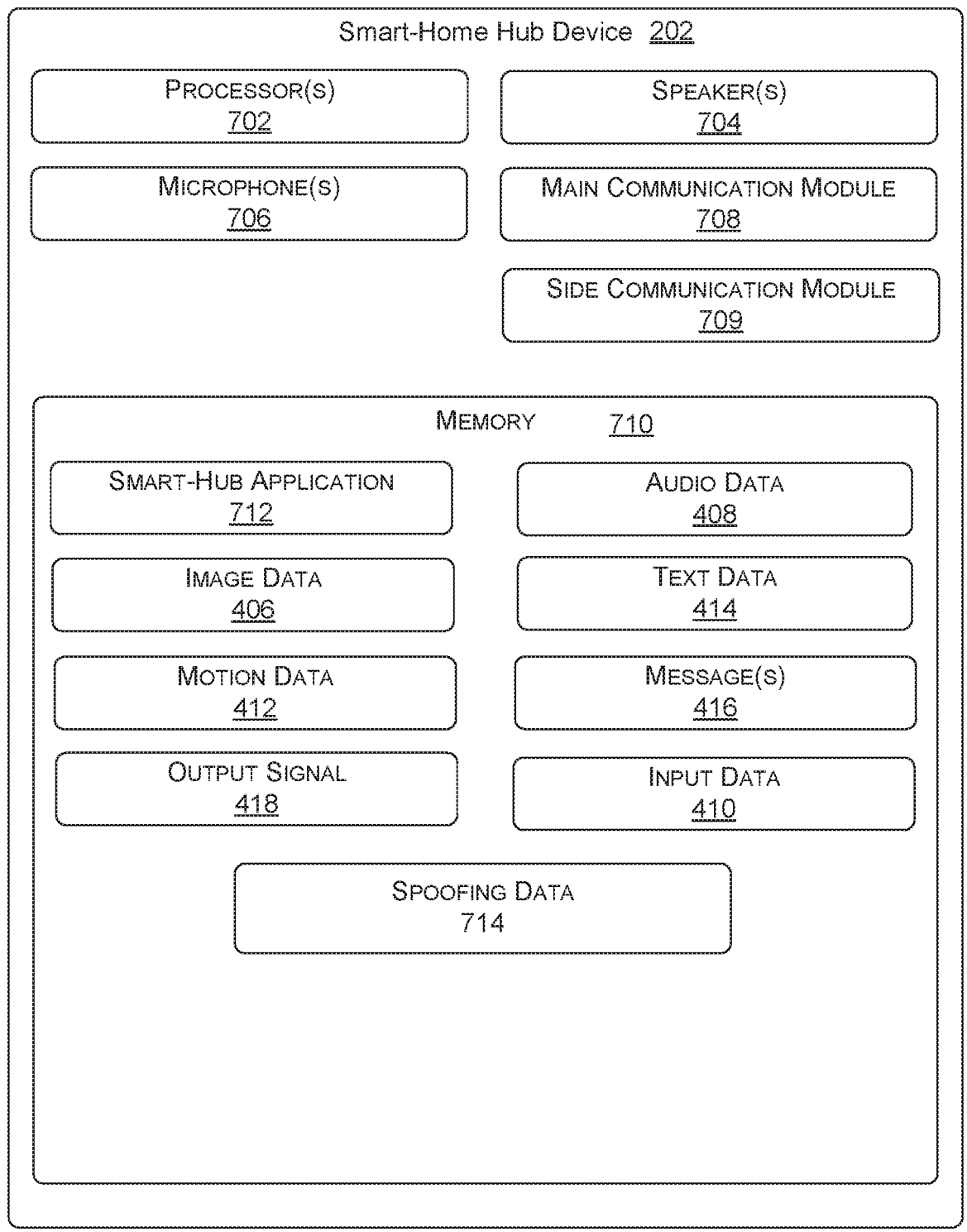
FIG. 7 is a functional block diagram illustrating one example embodiment of a smart-home hub device according to various aspects of the present disclosure.

FIG. 7 is a functional block diagram illustrating an embodiment of the smart-home hub device 202 (alternatively referred to herein as the "hub device 202") according to various aspects of the present disclosure. The hub device 202 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. The hub device 202 may comprise processor(s) 702 (which may be similar to, and/or include similar functionality as, the processor(s) 310) that are operatively connected to speaker(s) 704, microphone(s) 706, a main communication module 708 (which may be similar to, and/or include similar functionality as, the main communication module 312), and memory 710 (which may be similar to, and/or include similar functionality as, the memory 402). In some embodiments, the hub device 202 may further comprise one or more of a camera (not shown). In some embodiments, the hub device 202 may not include one or more of the components shown in FIG. 7, such as the speaker(s) 704 and/or the microphone(s) 706.

As shown in the example of FIG. 7, the memory 710 stores a smart-home hub application 712. In various embodiments, the smart-home hub application 712 may configure the processor(s) 702 to receive sensor data from the sensors 204 and/or the automation devices 206. For example, the sensor data may include a current state (e.g., opened/closed for door and window sensors, motion detected for motion sensors, living room lights on/off for a lighting automation system, etc.) of each of the sensors 204 and/or the automation devices 206. In some of the present embodiments, the sensor data may be received in response to sensor triggers. The sensor triggers may be a door opening/closing, a window opening/closing, lights being turned on/off, blinds being opened/closed, etc. As such, the sensor data may include the current state of the sensors 204 and/or the automation devices 206 as well as any updates to the current state based on sensor triggers.

With further reference to FIG. 7, the smart-home hub application 712 may configure the processor(s) 702 to receive the audio data 408, the text data 414, the image data 406, the motion data 412, the input data 410, and/or the messages 416 from the A/V device 210 (in some embodiments, via the backend server 224) using the main communication module 708. For example, the hub device 202 may receive and/or retrieve (e.g., after receiving a signal from the A/V device 210 that the A/V device 210 has been activated) the image data 406, the input data 410, and/or the motion data 412 from the A/V device 210 and/or the backend server 224 in response to motion being detected by the A/V device 210. The smart-hub application 712 may then configure the processor(s) 702 to transmit, using the main communication module 708, the audio data 408, the text data 414, the image data 406, the motion data 412, the input data 410, and/or the messages 416 to the client device 214, 216, the backend server 224, and/or an additional electronic device (e.g., a second A/V device 210, the automation device(s) 206, the sensor(s) 204, etc.).

The hub device 202 may also include a side communication module 709. The side communication module 709 may be used as described herein to communicate over a side communication channel. The messages 416 may be sent over the side communication channel using the side communication module 709. Some of the messages 709 may include, for example, an instruction to a bridge device to stop spoofing the hub device 202, an instruction to a bridge device to begin spoofing the hub device 202, an indication to a battery constrained device that the hub device 202 is beginning to spoof the battery constrained device, an indication to a battery constrained device that the hub device 202 is ceasing to spoof the battery constrained device, a wakeup signal, an instruction to go into reduced power mode, ID information (e.g., MAC address, IP address), updated ID information (e.g., a new IP address), or any other type of message. The memory 710 also includes spoofing data 714. The spoofing data 714 may include information about spoofing another device and/or information for spoofing the hub device 202. For example, the spoofing data 714 may include the ID information (e.g., the MAC address and/or the IP address) of a device being spoofed (either the hub device 202 or another device). The spoofing data 714 may also include instructions for how to communicate over the side communication channel using the side communication module 709 (e.g., message formats, listening intervals, etc.). Accordingly, the hub device 202 may therefore be used as a bridge device or may be spoofed by a separate bridge device as described herein. In various embodiments, the hub device 202 may also be used by a user to request audio and/or video data from an A/V device 210 that is being spoofed. For example, a user may request via an interface on their client device 214, 216 to see video captured by the A/V device 210. Such a request can be routed through a router and the hub device 202 acting as a bridge device as described herein. A wakeup signal that includes the request for the audio and/or video data is sent to the A/V device 210 being spoofed from the hub device 202, and the hub device 202 ceases spoofing the A/V device 210 so that the A/V device 210 can communicate with the client device 214, 216 via the router and transmit the requested audio and/or video data to the client device 214, 216.

Various processes will now be described, with respect to FIGS. 8-12, for performing spoofing and side channel communications to preserve battery power in a battery-powered device. Each of the processes described herein, including the processes 800 and 900, are illustrated as a collection of blocks in a logical flow graph, which represent a sequence of operations that may be implemented in hardware, software, or a combination thereof. Similarly, the signal processes 1000, 1100, and 1200 described herein may also be implemented in hardware, software, or a combination thereof. In the context of software, the blocks and/or signals represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks and/or signals may be combined in any order and/or in parallel to implement the processes. Additionally, any number of the described blocks and/or signals may be optional and eliminated to implement the processes.

Figure 8:
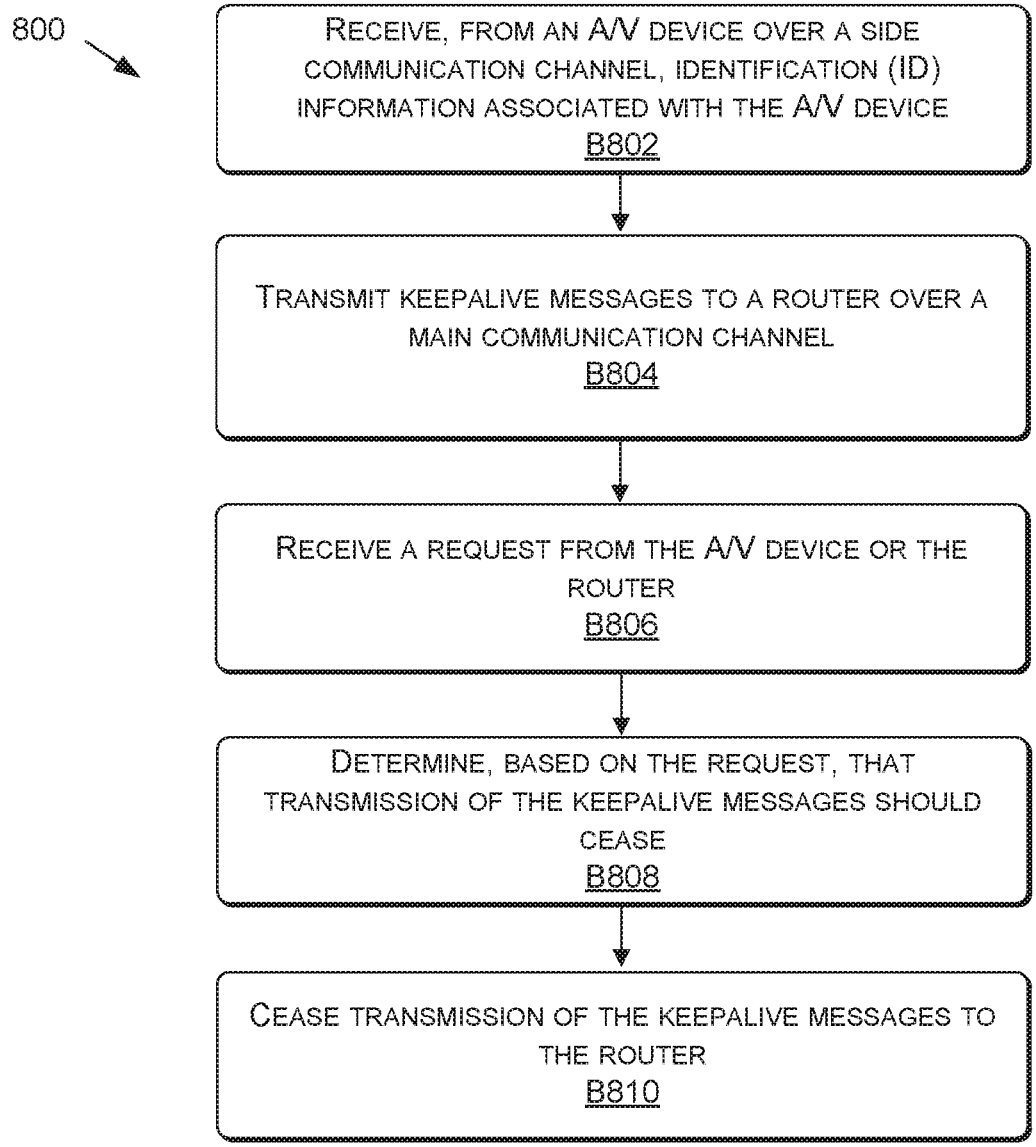
FIG. 8 is a flowchart illustrating an example process for transmitting keepalive messages for spoofing an A/V recording and communication device, according to various aspects of the present disclosure.

FIG. 8 is a flowchart illustrating an example process 800 for transmitting keepalive messages for spoofing an A/V recording and communication device, according to various aspects of the present disclosure. For example, the process 800 may be executed by a bridge device (e.g., the bridge device 104 of FIG. 1) by sending keepalive messages to a router (e.g., the router 106 of FIG. 1) over a main communication channel and communicating with a battery constrained device that is being spoofed (e.g., the A/V device 102 of FIG. 1) over a side communication channel. In other words, the process 800 provides a method for maintaining a network connection between a first network-connectable electronic device and a wireless access point (e.g., of a router) by a second network-connectable electronic device (e.g., the bridge device). The router may include one or more wireless access points through which various other devices including spoofed devices and bridge devices may connect. Although in FIGS. 8 and 9 the spoofing of an A/V device is discussed, the A/V device may be any other type of device as discussed herein (e.g., a client device, a sensor device, a smart home device, a hub device, a virtual assistant device, etc.) that can communicate over more than one communication channel.

At block B802, identification (ID) information of an A/V device (e.g., a first network-connectable electronic device, a battery constrained device, etc.) is received at a bridge device (e.g., a second network-connectable electronic device which may include non-battery constrained devices) from the A/V device over a side radio frequency (RF) channel (e.g., a lower power radio channel such as a 900 MHz channel). In an alternative embodiment, the ID information may be received over a main RF channel (e.g., a Wi-Fi channel) as described herein. At block 804, keepalive messages are transmitted from the bridge device to the router over a main RF channel different from the side RF channel. These keepalive messages are configured as described herein to keep the network connection between the router and the A/V device active. The keepalive messages may include, for example, the ID information of the A/V device (e.g., MAC address, first IP address). The keepalive messages may be transmitted at regular intervals, for example at least approximately every 0.1 seconds. In various embodiments, the bridge device may also transmit, in response to receiving the ID information of the A/V device, an instruction to the A/V device to cease transmitting keepalive messages to the router so that the A/V device can enter a reduced power mode and be spoofed by the bridge device. In some embodiments, the instruction may include a command to enter the reduced power mode, while in other embodiments the A/V device may deduce that reduced power mode may be entered based on receipt of the instruction to cease transmitting keepalive messages.

In various embodiments, the bridge device may also receive an IP address reassignment message, respective of the spoofed device, from the router. In other words, a new IP address may be assigned by the router to the A/V device that the bridge device is spoofing. The IP address reassignment message may include a second IP address assigned by the router to the A/V device that replaces the previous, first IP address of the A/V device. That IP address reassignment message may be received at the bridge device before a request of block B806 described below is received at the bridge device, but after the ID information is received at the bridge device from the A/V device. In other words, the IP address may be reassigned while the bridge device is spoofing the A/V device by transmitting keepalive messages at block B804, before the bridge device ceases spoofing the A/V device.

In response to receiving the IP address reassignment message, the bridge device may also transmit the second IP address to the A/V device over the side RF channel. In this way, the A/V device knows the new IP address when the A/V device resumes communicating with the router. This process of a new IP address being assigned and updating the A/V device accordingly may occur any number of times while the A/V device is being spoofed by the bridge device.

At block B806, a request from at least one of the router and the A/V device is received at the bridge device. For example, the request may be a request from the A/V device to cease sending keepalive messages because motion has been detected by the A/V device, and the A/V device will resume communications over the main communication channel with the router in order to communicate with a server or client device regarding that detected motion. In another example, the request may be a request from the router that requests video and/or audio data to be captured by the A/V device (which request may have originated at a user client device, for example). Where the request is from the router, the bridge device may send a wakeup signal to the A/V device over the side communication channel that instructs the A/V device to exit the reduced power mode.

At block B808, it is determined based on the request from at least one of the router and the A/V device that transmission of the keepalive messages should cease. In other words, the bridge device will cease spoofing the A/V device based on the request. At block 810, transmission of the keepalive messages to the router by the bridge device is actually ceased.

Figure 9:
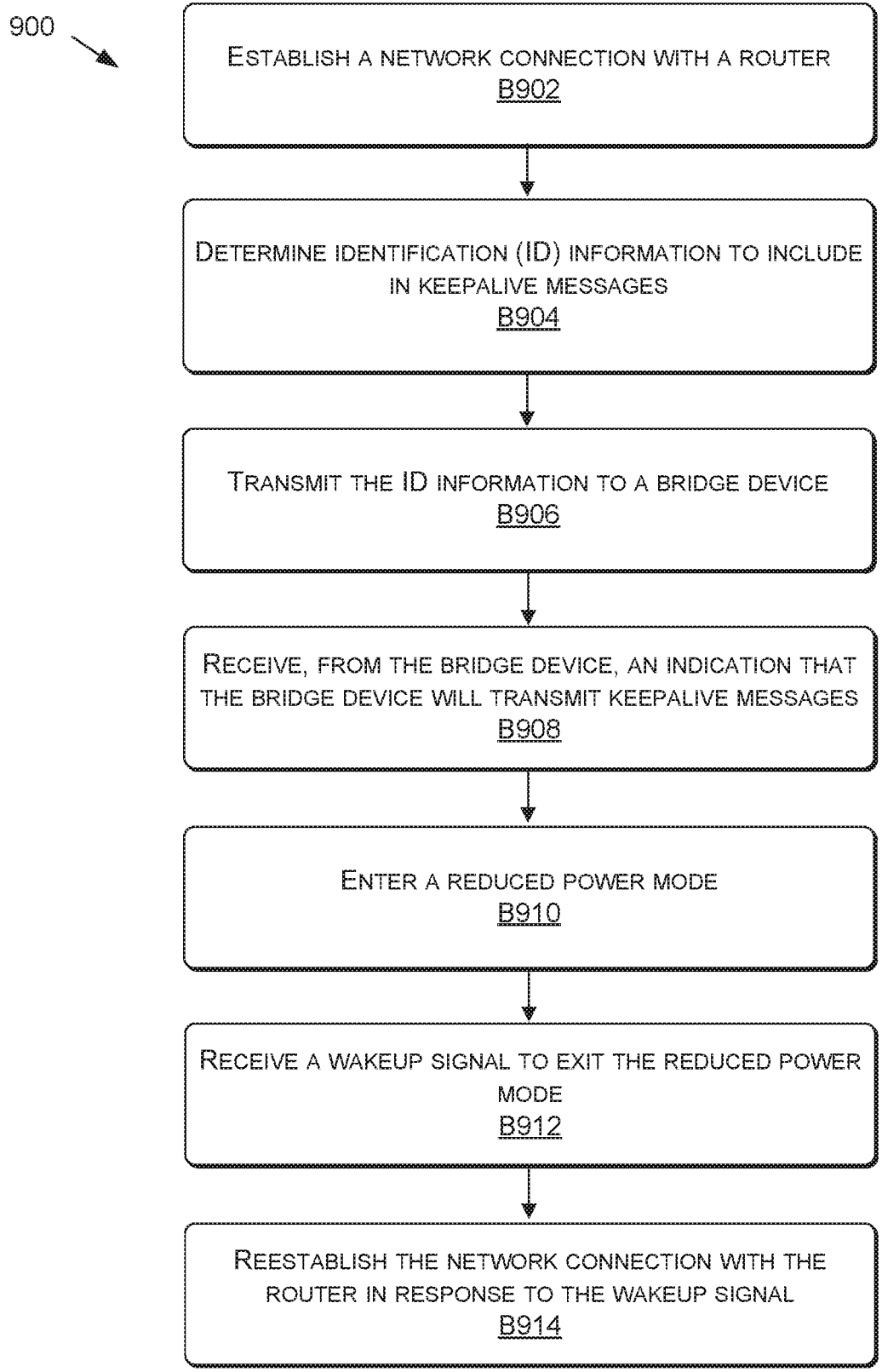
FIG. 9 is a flowchart illustrating an example process for maintaining a network connection in a low-power mode, according to various aspects of the present disclosure.

FIG. 9 is a flowchart illustrating an example process 900 for maintaining a network connection in a low-power mode, according to various aspects of the present disclosure. For example, the process 900 may be executed by a battery constrained device (e.g., the A/V device 102 of FIG. 1) to cause a bridge device (e.g., the bridge device 104 of FIG. 1) to send keepalive messages to a router (e.g., the router 106 of FIG. 1) over a main communication channel on behalf of the A/V device (that is, spoof the A/V device to the router), where the battery constrained device may communicate with the bridge device over a side communication channel while it is spoofed. The router may include one or more wireless access points through which various other devices including spoofed devices and bridge devices may connect. The process 900 therefore provides a way for a network connection between a first network-connectable device and a router to be maintained.

At block B902, the A/V device establishes a connection with a router. The connection may be over a main communication channel (e.g., a Wi-Fi channel). A router or wireless access point may be capable of connecting to multiple devices at once, but may have a limit to the number of devices it can connect to. The number of devices may also be limited by the number of channels, ports, or sockets through which the router can connect to different devices. These channels, ports, or sockets may be either wireless or wired. Even if a router may theoretically connect to unlimited devices, routers may have a functional limit of devices it can connect to due to constraints of bandwidth for communication with those devices. Therefore, wireless networks may be configured to time out connections with certain devices if data is not transferred through an established connection after a predetermined period of time. This allows a router, such as a Wi-Fi router, to open up channels, ports, or sockets that are not being used. However, as described generally herein, reestablishing a connection with a router can take time, delaying data transmission from the device seeking to reestablish a connection. In order to prevent that connection to the channel, port, or socket from timing out and be terminated by the router, a device can send keepalive messages as described generally herein.

At block 904, ID information of the A/V device to include in keepalive messages is determined. The keepalive messages, as described herein, are configured to keep the network connection between the router and the A/V device active. The ID information may include, for example the MAC address and the IP address of the A/V device. The MAC address may be known by the A/V device before the connection is established at the block B902. The IP address may be assigned to the A/V device at or after establishment of the connection between the A/V device and the router. Accordingly, the connection between the A/V device and the router may be established before the ID information is transmitted to the bridge device so that the IP address is known.

At block B906, the ID information (e.g., the ID information determined at block B904) is transmitted to a bridge device. The ID information may be transmitted over a main communication channel or a side communication channel as described herein. In some embodiments, the A/V device and the bridge device may also exchange other messages to configure the spoofing. For example, the bridge device may send a message indicating that it is capable of spoofing (e.g., sending keepalive messages) and/or communicating over a side communication channel. The A/V device may, for example, send a message indicating that it is battery powered and that spoofing is desired and/or requested.

At block B908, the A/V device receives an indication, from the bridge device, that the bridge device will transmit keepalive messages comprising the ID information to maintain the network connection between the A/V device and the router. The indication may be received over a main communication channel or a side communication channel as described herein.

At block B910, the A/V device enters a reduced power mode. In the reduced power mode, the A/V device consumes less power than when it is listening for communications over a main communication channel and/or sending keepalive messages over the main communication channel. The reduced power mode may be entered by the A/V device after or in response to transmitting the ID information at the block B906 and/or after or in response to receiving the indication at the block B908. In some embodiments, no audio or video data is communicated between the A/V device and the router during the reduced power mode. In some embodiments, no communications at all occur between the A/V device and the router during the reduced power mode. In various embodiments, only communications over the side communication channel to and/or from the A/V device occur during the reduced power mode.

At block B912, a wakeup signal is received by the A/V device to exit the reduced power mode. The wakeup signal may be received at the A/V device via a side communication channel as described herein. The wakeup signal may, for example, include a request for audio and/or video data originating from a client device. The wakeup signal may also be a result of an action or determination at the A/V device. For example, the wakeup signal may generated at the A/V device based on a button press at the A/V device or based on motion detected by the A/V device. At block B914, the network connection with the router is reestablished in response to the wakeup signal. For example, once the network connection is reestablished, video and/or audio data may be streamed to the router. That video and/or audio data is streamed over the main communication channel as described herein.

In various embodiments, the A/V device may also transmit keepalive messages to the router after initially establishing the network connection at the block B902 and before receiving transmitting the ID information to the bridge device at the block B906 and/or before receiving the indication that the bridge device will transmit keepalive messages at the block B908. The A/V device may therefore cease the transmitting of the keepalive messages after transmitting the ID information at the block B906 and/or receiving the indication at the block B908.

In various embodiments, the A/V device may also receive an IP address reassignment message from the bridge device. The IP address reassignment message may include a second IP address assigned by the router to the A/V device. The IP address reassignment message may be received at the A/V device over a side communication channel. The IP address reassignment message may be received while the A/V device is in a reduced power mode. Upon receiving the message, the A/V device may, for example, in the memory of the A/V device the new IP address associated with a connection to the router.

In an alternative embodiment, IP address reassignment messages are not sent to the A/V device while the A/V device is in reduced power mode (e.g., while the A/V device is being spoofed by the bridge device). Instead, the bridge device may update the A/V device with any new IP address when a wakeup signal is sent to the A/V device from the bridge device (e.g., the new IP address may be included in the wakeup signal). In another embodiment where the wakeup signal originates at the A/V device, an instruction to cease sending keepalive messages may be transmitted from the A/V device to the bridge device. In such an example, the new IP address may be sent to the A/V device in response to the instruction to cease sending keepalive messages. Thus, the A/V device may preserve power by not receiving messages during reduced power mode that indicated reassigned/new IP addresses. This aspect may be especially valuable in embodiments where IP addresses are frequently reassigned. In such embodiments, an IP address may be reassigned many times before the A/V device resumes connection with a router. Thus, many IP address reassignment messages may be received by the A/V device that are never actually used by the A/V device.

Figure 10:
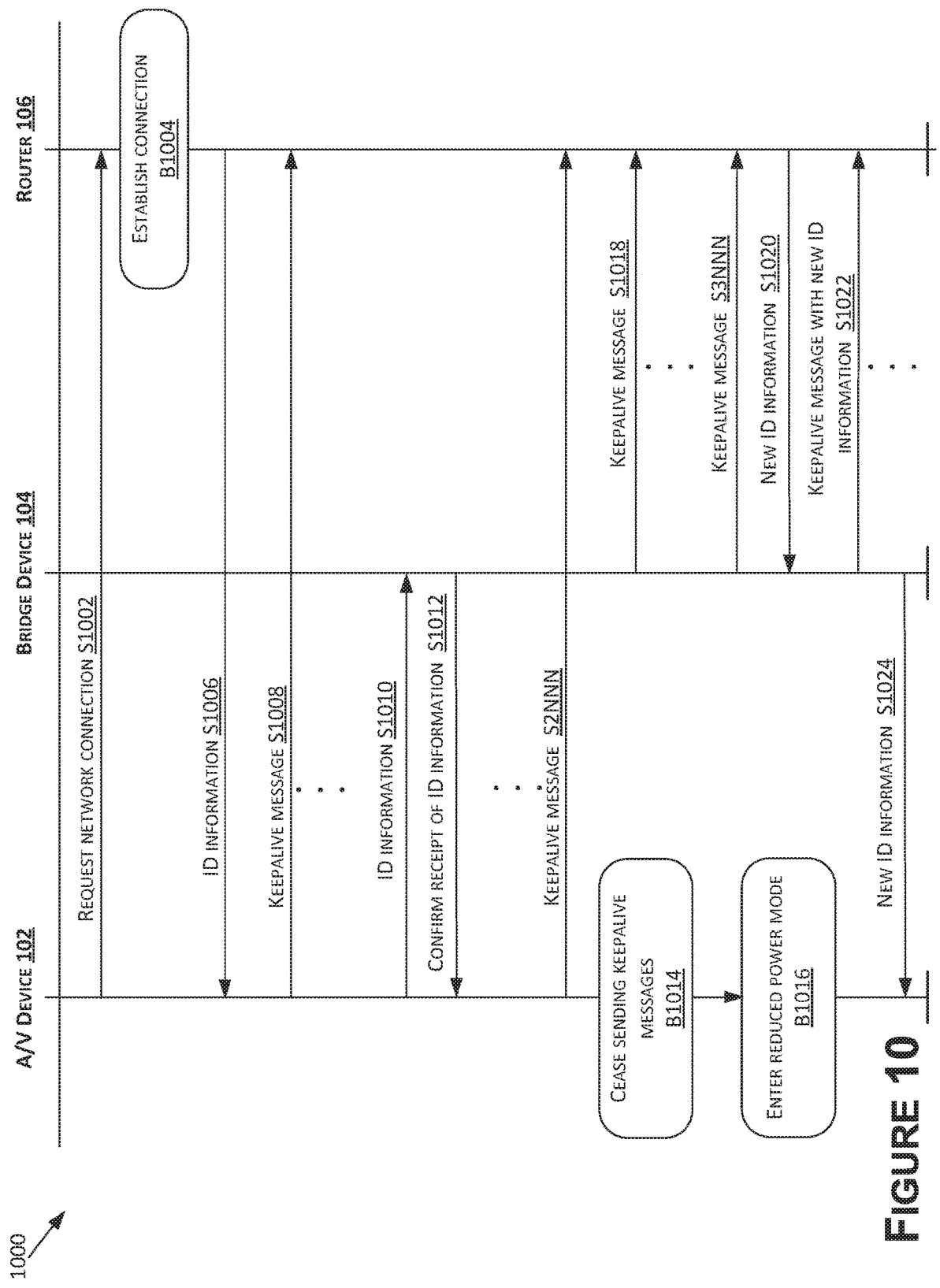
FIG. 10 is a signal diagram of a process for spoofing an A/V recording and communication device to save power, according to various aspects of the present disclosure.

FIG. 10 is a signal diagram of a process 1000 for spoofing an A/V device 210 to save power, according to various aspects of the present disclosure. In particular, the process 1000 shows example signals that may be sent between the A/V device 102, the bridge device 104, and the router 106 according to various embodiments described herein to spoof the A/V device 102 and extend a life of its battery.

The A/V device 102 sends a signal S1002 to the router 106 to request a network connection. At block B1004, the router 106 establishes a connection with the A/V device 102. The router 106 sends a signal S1006 to the A/V device 102 that includes the ID information. The ID information may include, for example, an IP address assigned to the A/V device 102 by the router 106. The router 106 may also send a confirmation that the connection has been established to the A/V device 102 (or that confirmation may be included in the signal S1006). The A/V device 102 then sends keepalive messages S1008 to S2NNN to the router 106 to maintain the connection between the A/V device 102 and the router 106 while the spoofing by the bridge device is being configured according to signals S1010 and S1012. In an alternative embodiment, the keepalive messages S1008 to S2NNN may not be sent if the A/V device 102 is otherwise communicating with the router 106 and maintaining the connection between the A/V device 102 and the router 106.

To configure the bridge device 104 for spoofing, the A/V device 102 sends the ID information to the bridge device as a signal S1010. The bridge device 104 then sends a confirmation of receipt signal S1012. This confirmation receipt signal S1012 may also include an instruction to cease sending keepalive messages and/or may include a confirmation that the bridge device will take over sending keepalive messages to the router 106 on behalf of the A/V device 102.

The A/V device 102 can therefore cease sending keepalive messages at block B1014 and enter reduced power mode at block B1016. While the A/V device 102 is in reduced power mode, the bridge device 104 spoofs the A/V device 102 to keep the connection open by sending keepalive messages S1018 to S3NNN to the router 106. Many keepalive messages may be sent over this period of time, as the keepalive messages may be sent, for example, every 0.1 seconds to keep the connection with the router 106 active.

In some instances, an IP address for the A/V device may be reassigned by the router 106. Accordingly, the router 106 transmits a new ID information signal S1020 designed to be received by the A/V device 102. However, because the A/V device 102 is in a reduced power mode and is not listening for communications over the main communication channel, the signal S1020 is not received at the A/V device 102. The bridge device 104, on the other hand, is spoofing the A/V device 102 and is listening for messages on behalf of the A/V device 102. Accordingly, unbeknownst to the router 106, the signal S1020 is received at the bridge device 104. The bridge device 104 then begins sending new keepalive messages with the new ID information starting with the signal S1022. The bridge device 104 may also update the A/V device 102 with the new ID information assigned by the router 106 with a signal S1024. The signal S1024 may be sent, for example, over a side communication channel that consumes less power than the main communication channel since the A/V device 102 is in a reduced power mode. Although FIG. 10 shows the bridge device 104 sending signal S1024 while the A/V device 102 is in reduced power mode, the new ID information signal S1024 may also be sent to the A/V device 102 after the A/V device 102 has exited reduced power mode as described herein. In such an embodiment, the signal S1024 may be sent over either a main or side communication channel.

Figure 11:
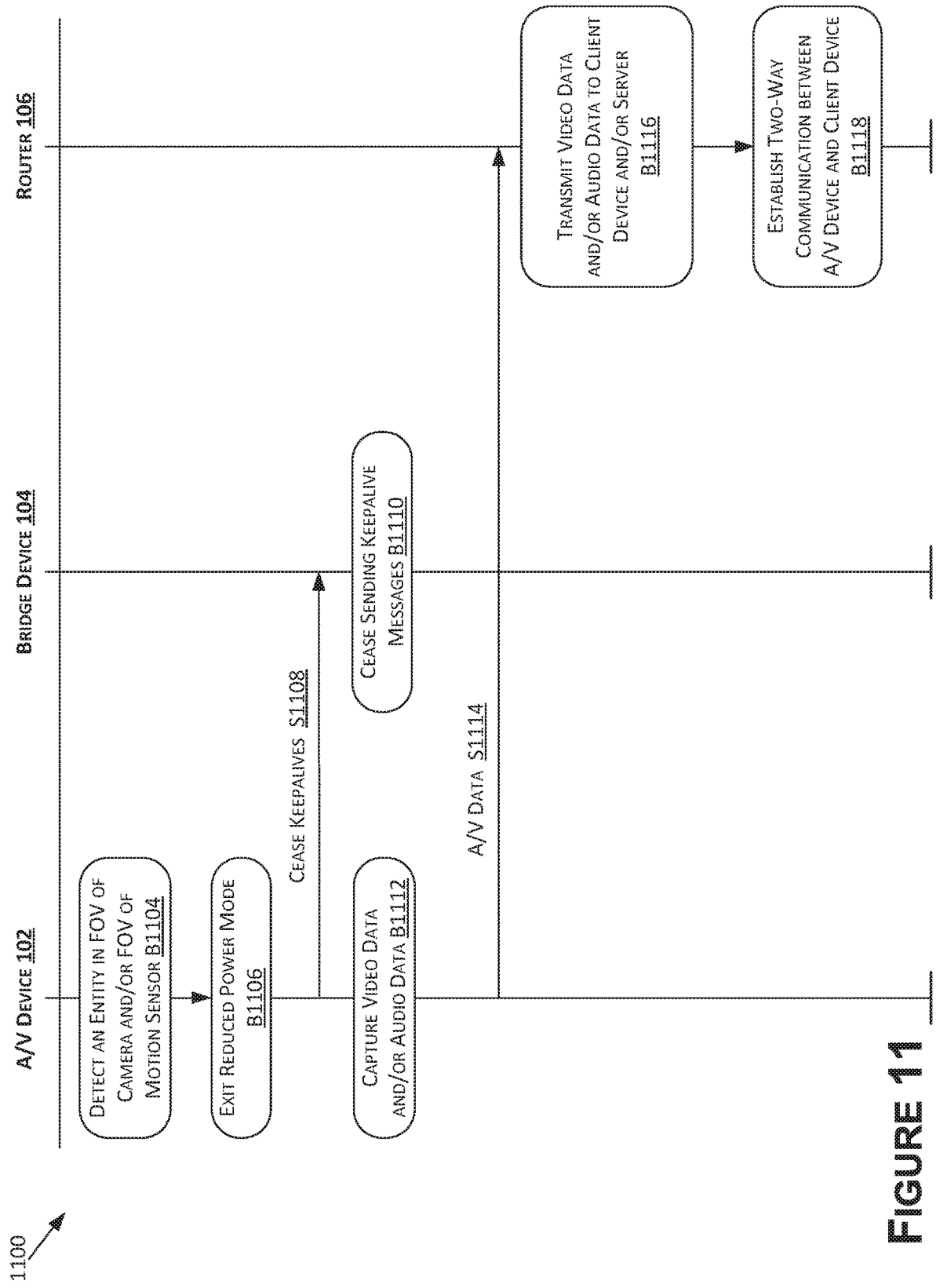
FIG. 11 is a signal diagram of a process for ceasing device spoofing to stream A/V content from an A/V recording and communication device, according to various aspects of the present disclosure.

FIG. 11 is a signal diagram of a process 1100 for ceasing device spoofing to stream A/V content from an A/V device 102, according to various aspects of the present disclosure. In particular, the process 1100 shows ceasing device spoofing based on a wakeup signal originating at the A/V device 102 based on the A/V device 102 detecting motion as described herein. The beginning of the process 1100 assumes that the bridge device 104 is sending keepalive messages (not shown) to the router 106 to spoof the A/V device 102, and that the A/V device 102 is already in a reduced power mode. In other words, the process 1100 may be a continuation of and occur subsequent to the process 1000.

At block B1104, the A/V device 102 detects an object in a field of view of a camera and/or a field of view of a motion sensor. For example, the A/V device 102 may detect the presence of an object within a field of view of view of the motion sensor(s) 326 (e.g., a motion sensor field of view) and/or a field of view of the camera 314 (e.g., a camera field of view). To detect motion using the motion sensor(s) 326, the data type (e.g., voltage for PIR sensors) from the output signal of the motion sensor(s) 326 may be analyzed, by the processor(s) 310 of the A/V device 102, to determine whether the output signal is indicative of motion of an object that should prompt the recording and/or transmission of the image data 406 and/or audio data 408. To detect motion using the camera 314, the processor(s) 310 of the A/V device 102 may analyze the image data 406 by performing, for example, a frame by frame comparison of a change in pixels, to determine whether the image data 406 is indicative of motion of an object that should prompt the recording and/or transmission of image data 406 and/or audio data 408.

At block B1106, the A/V device 102 exits reduced power mode based on the detection of motion by the camera or motion sensor. In other words, in the process 1100, the A/V device 102 generates its own wakeup signal based on the detected motion, which causes the A/V device 102 to exit reduced power mode. In response to exiting reduced power mode at the block B1106, the A/V device 102 sends a message indicating that the bridge device 104 should cease sending keepalive messages to the router 106 (and thereby cease spoofing the A/V device 102. In response to the signal S1108, the bridge device 104 therefore ceases sending the keepalive messages at block B1110. In various embodiments, the block B1104 that causes the A/V device 102 to exit reduced power mode may be a button press (e.g., user input) at the A/V device 102 instead of or in addition to a detection of motion.

In response to detecting the motion, the A/V device 102 captures video and/or audio data at block B1112. For example, the processor(s) 310 of the A/V device 102 may cause the camera 314 to begin generating the image data 406 and/or the microphone(s) 328 to begin recording the audio data 408. At signal S1114, the A/V device 102 transmits the video data and/or the audio data to the router 106. At block B1116, the router 106 transmits the video and/or audio data to a client device (e.g., the client device 214, 216) and/or server (e.g., the server 108). In some embodiments, the system also establishes, via the router 106, two-way communication between the A/V device 102 and the client device at block B1118. In this way, a client may communicate with someone at the A/V device 102. For example, the processor(s) 702 of the client device(s) 214, 216, using the main communication module 710, may initiate a two-way communication session with the A/V device 102. In response, the A/V device 102 may receive the two-way communication request from the client device(s) 214, 216. Once the two-way communication session is established, the voice/sound input at the client device(s) 214, 216, as captured by the microphone(s) 706 of the client device(s) 214, 216, may be transmitted as audio data to the A/V device 102 for output by the speaker(s) 330. Additionally, the voice/sound input at the A/V device 102, as captured by the microphone(s) 328 of the A/V device 102, may be transmitted as audio data 408 to the client device 214, 216 for output by the speaker(s) 608 of the client device(s) 214, 216.

Figure 12:
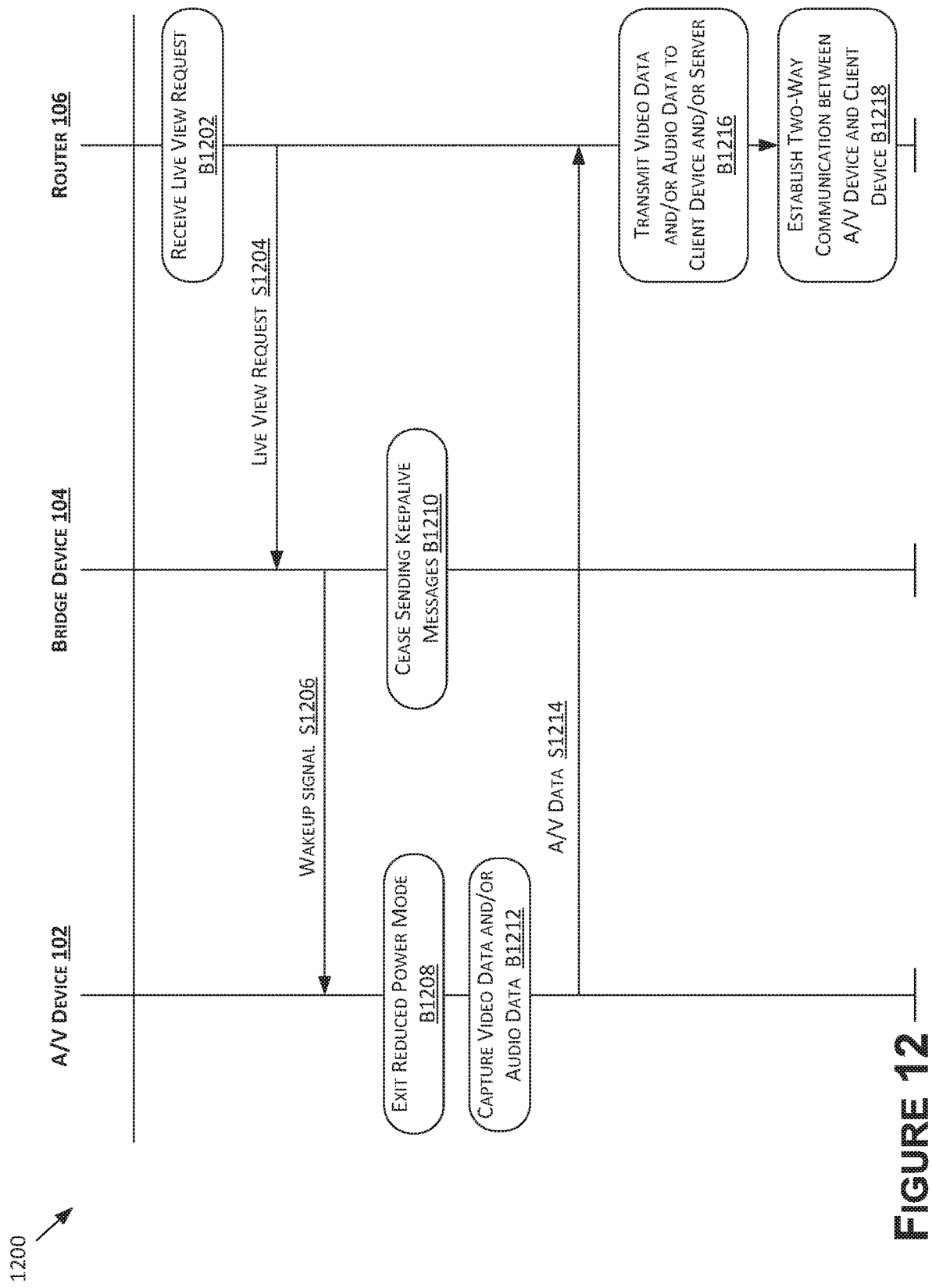
FIG. 12 is a signal diagram of a process for ceasing device spoofing to initiate a video-on-demand session for A/V content from an A/V recording and communication device, according to various aspects of the present disclosure.

FIG. 12 is a signal diagram of a process 1200 for ceasing device spoofing to initiate a video-on-demand session for A/V content from an A/V device 210, according to various aspects of the present disclosure. In particular, the process 1200 shows ceasing device spoofing based on a live view request originating at a client device (e.g., the client device 214, 216) as described herein. The beginning of the process 1200 assumes that the bridge device 104 is sending keepalive messages (not shown) to the router 106 to spoof the A/V device 102, and that the A/V device 102 is already in a reduced power mode. In other words, the process 1200 may be a continuation of the process 1000.

At block B1202, the router 106 receives a live view request. For example, the processor(s) 702 of the client device 214, 216 may receive a live view request from a user of the client device 214, 216. The live view request may include an input to user interface (e.g., the display 716, such as within a GUI 718 on the display 716, one or more physical buttons of the client device 214, 216, etc.). The live view request received at the client device 214, 216 is then sent to the router 106 so that it can be transmitted to the A/V device 102.

The router 106 transmits the live view request at signal S1204. The router 106 believes the live view request will be received at the A/V device 102. However, since the bridge device 104 is spoofing the A/V device 102 and listening on the main communication channel while the A/V device 102 is in reduced power mode, the signal S1204 is received at the bridge device 104.

The bridge device 104 then sends a wakeup signal S1206 to the A/V device 102. The wakeup signal S1206 may include the live view request. The wakeup signal S1206 is sent by the bridge device 104 and received by the A/V device 102 over the side communication channel since the A/V device is in reduced power mode and is not listening for communications over a main communication channel. In response to receiving the wakeup signal S1206, the A/V device 102 exits reduced power mode at a block B1208. The bridge device 104 ceases sending keepalive messages at block B1210 because the A/V device 102 will resume communicating with the router 106.

The A/V device 102 then captures video and/or audio data at block B1212. This block may be similar to the block B1112 of the process 1100, described above. At signal S1214, the A/V device 102 transmits the video data and/or the audio data to the router 106. This signal may be similar to signal S1114 of the process 1100, described above. At block B1216, the router 106 transmits the video data and/or audio data to a client device and/or server. This block may be similar to block B1116 of the process 1100, described above. At block B1218, the router establishes two-way communication between the A/V device 210 and a client device. This block may be similar to block B1118 of the process 1100, described above.

Accordingly, as described in various embodiments herein, a first device such as the battery constrained A/V device 102 is spoofed by a second device, such as the non-battery constrained bridge device 104. The bridge device 104 may spoof the A/V device 102 by sending keepalive messages to a router, such as the router 106. This keeps a connection between the router 106 and the A/V device 102 open so that the devices do not have to take the time to reestablish a connection. In addition, the spoofing by the bridge device 104 helps the A/V device 102 consume less power, because the A/V device 102 can avoid having to listen for communications on a higher power communication channel and avoid having to send keepalive messages to keep the communication channel open. Instead, the bridge device 104 and the A/V device 102 can communicate over a lower power side communication channel. In this way, the main communication channel between the router 106 and the A/V device 102 stays open, but the A/V device 102 can consume less power, extending the life of a battery of the A/V device 102.

Figure 13:
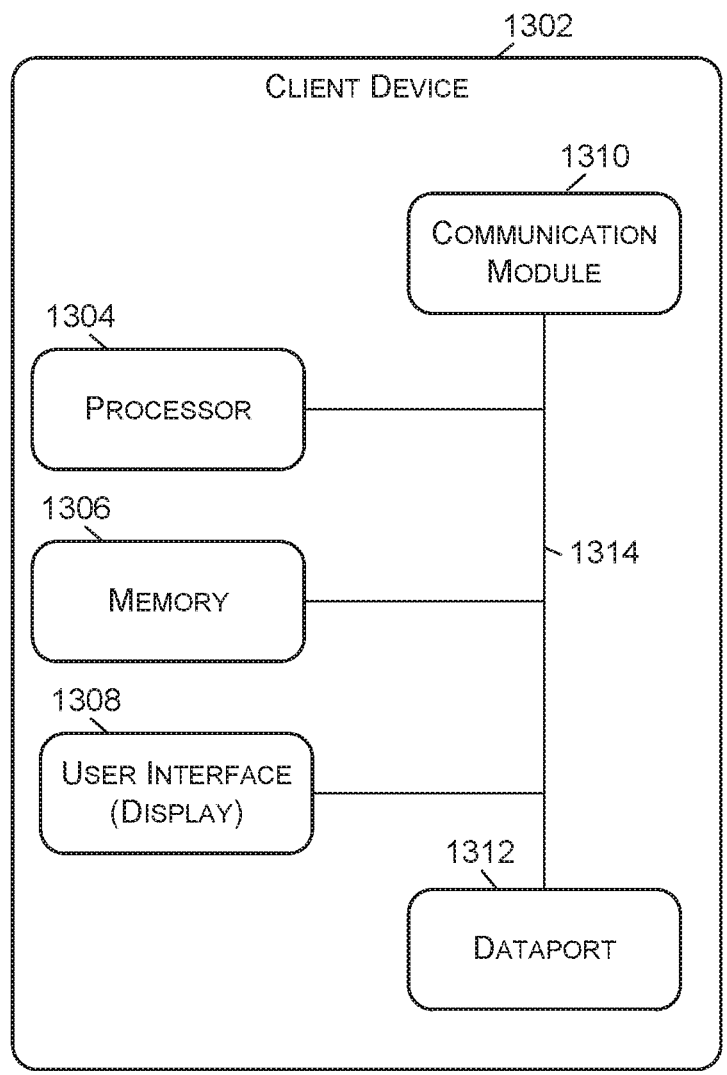
FIG. 13 is a functional block diagram of a client device on which the present embodiments may be implemented, according to various aspects of the present disclosure.

FIG. 13 is a functional block diagram of a client device 1302 on which the present embodiments may be implemented according to various aspects of the present disclosure. The client device(s) 214, 216 described with reference to FIG. 2 may include some or all of the components and/or functionality of the client device 1302. The client device 1302 may comprise, for example, a smartphone.

With reference to FIG. 13, the client device 1302 includes a processor 1304, a memory 1306, a user interface 1308, a communication module 1310, and a dataport 1312. These components are communicatively coupled together by an interconnect bus 1314. The processor 1304 may include any processor used in smartphones and/or portable computing devices, such as an ARM processor (a processor based on the RISC (reduced instruction set computer) architecture developed by Advanced RISC Machines (ARM).). In some embodiments, the processor 2004 may include one or more other processors, such as one or more conventional microprocessors, and/or one or more supplementary co-processors, such as math co-processors.

The memory 1306 may include both operating memory, such as random-access memory (RAM), as well as data storage, such as read-only memory (ROM), hard drives, flash memory, or any other suitable memory/storage element. The memory 1306 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 1304 and the memory 1306 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1304 may be connected to the memory 1306 via the dataport 1312.

The user interface 1308 may include any user interface or presentation elements suitable for a smartphone and/or a portable computing device, such as a keypad, a display screen, a touchscreen, a microphone, and a speaker. The communication module 1310 is configured to handle communication links between the client device 1302 and other, external devices or receivers, and to route incoming/outgoing data appropriately. For example, inbound data from the dataport 1312 may be routed through the communication module 1310 before being directed to the processor 1304, and outbound data from the processor 1304 may be routed through the communication module 1310 before being directed to the dataport 1312. The communication module 1310 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1312 may be any type of connector used for physically interfacing with a smartphone and/or a portable computing device, such as a mini-USB port or an IPHONE®/IPOD® 30-pin connector or LIGHTNING® connector. In other embodiments, the dataport 1312 may include multiple communication channels for simultaneous communication with, for example, other processors, servers, and/or client terminals.

The memory 1306 may store instructions for communicating with other systems, such as a computer. The memory 1306 may store, for example, a program (e.g., computer program code) adapted to direct the processor 1304 in accordance with the present embodiments. The instructions also may include program elements, such as an operating system. While execution of sequences of instructions in the program causes the processor 1304 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 14:
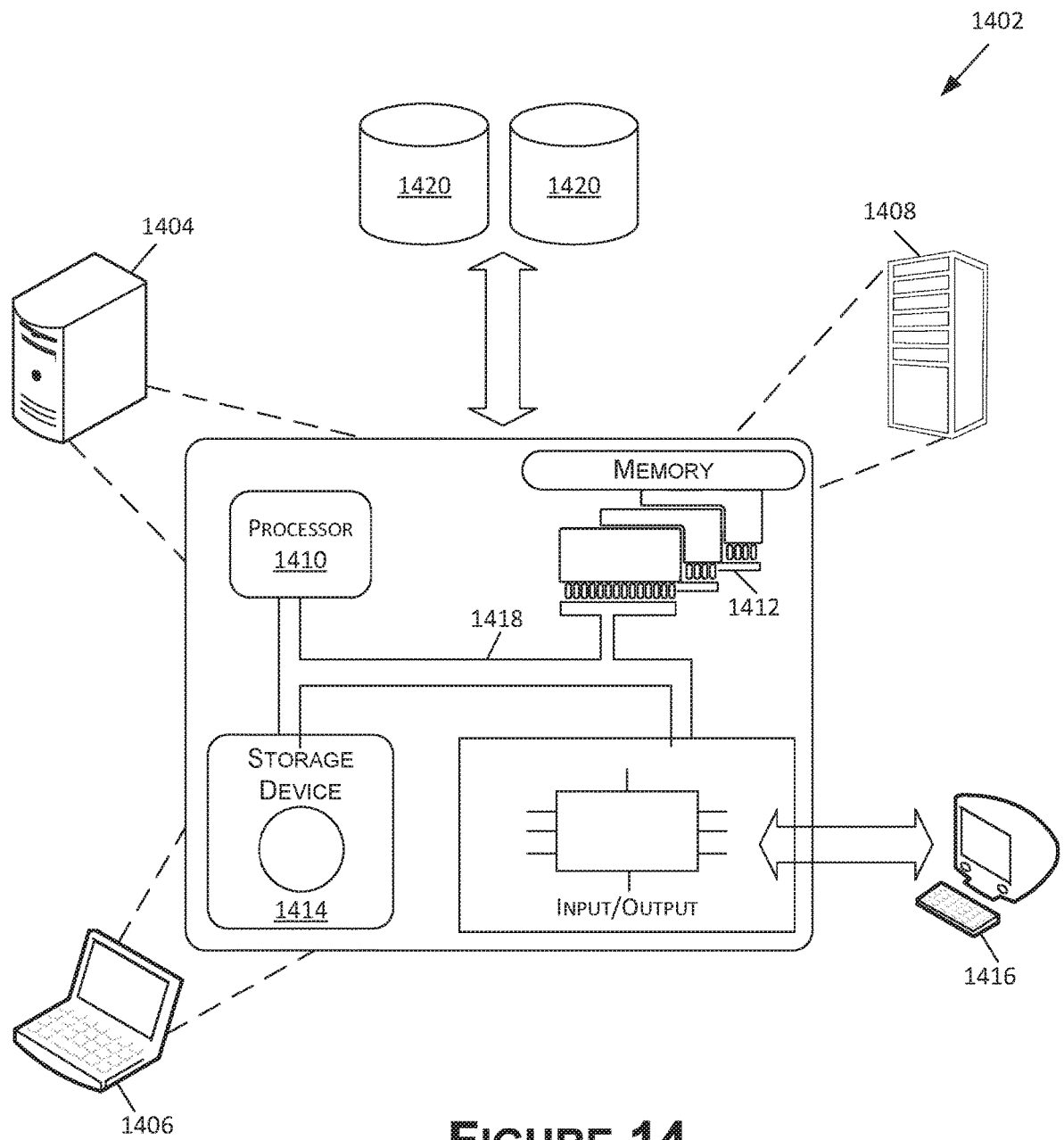
FIG. 14 is a functional block diagram of a general-purpose computing system on which the present embodiments may be implemented, according to various aspects of present disclosure.

FIG. 14 is a functional block diagram of a general-purpose computing system on which the present embodiments may be implemented according to various aspects of the present disclosure. The computer system 1402 may be embodied in at least one of a personal computer (also referred to as a desktop computer) 1404, a portable computer (also referred to as a laptop or notebook computer) 1406, and/or a server 1408 is a computer program and/or a machine that waits for requests from other machines or software (clients) and responds to them. A server typically processes data. The purpose of a server is to share data and/or hardware and/or software resources among clients. This architecture is called the client—server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1402 may execute at least some of the operations described above. The computer system 2102 may include at least one processor 1410, memory 1412, at least one storage device 1414, and input/output (I/O) devices 1416. Some or all of the components 1410, 14 12, 1414, 1416 may be interconnected via a system bus 1418. The processor 1410 may be single- or multi-threaded and may have one or more cores. The processor 1410 execute instructions, such as those stored in the memory 1412 and/or in the storage device 1414. Information may be received and output using one or more I/O devices 1416.

The memory 1412 may store information, and may be a computer-readable medium, such as volatile or non-volatile memory. The storage device(s) 1414 may provide storage for the system 2102 and, in some embodiments, may be a computer-readable medium. In various aspects, the storage device(s) 1414 may be a flash memory device, a hard disk device, an optical disk device, a tape device, or any other type of storage device.

The I/O devices 1416 may provide input/output operations for the system 1402. The I/O devices 1416 may include a keyboard, a pointing device, and/or a microphone. The I/O devices 1416 may further include a display unit for displaying graphical user interfaces, a speaker, and/or a printer. External data may be stored in one or more accessible external databases 1420.

In a first aspect, a method for maintaining a network connection between a first network-connectable electronic device and a wireless access point is provided. The method involves receiving, at a second network-connectable electronic device from the first network-connectable electronic device, identification (ID) information of the first network-connectable electronic device. The ID information is received over a first radio frequency (RF) channel. The method further involves transmitting, from the second network-connectable electronic device to the wireless access point over a second RF channel different from the first RF channel, keepalive messages configured to keep the network connection between the wireless access point and the first network-connectable electronic device active. The keepalive messages include the ID information of the first network-connectable electronic device. The method further involves receiving, at the second network-connectable electronic device, a request from at least one of the wireless access point and the first network-connectable electronic device. The method further involves determining based on the request, at the second network-connectable electronic device, that transmission of the keepalive messages should cease. The method further involves ceasing transmission of the keepalive messages to the wireless access point.

In an embodiment of the first aspect, the ID information includes a media access control (MAC) address associated with the first network-connectable electronic device.

In another embodiment of the first aspect, the ID information includes an internet protocol (IP) address associated with the first network-connectable electronic device.

In another embodiment of the first aspect, the IP address is a first IP address and the method further involves receiving, at the second network-connectable electronic device, an IP address reassignment message from the wireless access point. The IP address reassignment message includes a second IP address assigned by the wireless access point to the first network-connectable electronic device. The method further involves transmitting, from the second network-connectable electronic device, the second IP address to the first network connectable electronic device over the first RF channel.

In another embodiment of the first aspect, the IP address reassignment message is received at the second network-connectable electronic device before the request is received and after the ID information is received from the first network-connectable electronic device.

In another embodiment of the first aspect, the request is received from the first network-connectable electronic device.

In another embodiment of the first aspect, the request is received over the first RF channel.

In another embodiment of the first aspect, the request includes an instruction to cease transmitting keepalive messages.

In another embodiment of the first aspect, the request is received from the wireless access point.

In another embodiment of the first aspect, the request includes an instruction that the first network-connectable electronic device begin streaming video to the wireless access point.

In another embodiment of the first aspect, the request is received over the second RF channel.

In another embodiment of the first aspect, the request is a first request and the method further involves transmitting, to the first network-connectable electronic device, a second request including at least some information from the first request.

In another embodiment of the first aspect, the second request is transmitted over the first RF channel.

In another embodiment of the first aspect, the second RF channel is a Wi-Fi channel.

In another embodiment of the first aspect, the first RF channel is a channel that consumes less power than the second RF channel.

In another embodiment of the first aspect, the first RF channel is a 900 megahertz (MHz) channel.

In another embodiment of the first aspect, the first RF channel is a Bluetooth Low Energy (LE) RF channel.

In another embodiment of the first aspect, the first RF channel is a Zigbee RF channel.

In another embodiment of the first aspect, the keepalive messages are transmitted to the wireless access point at least approximately every 0.1 seconds.

In another embodiment of the first aspect, the method further involves transmitting, in response to receiving the ID information of the first network-connectable electronic device, an instruction to the first network-connectable electronic device to cease transmitting keepalive messages to the wireless access point.

In another embodiment of the first aspect, the instruction further includes a command to the first network-connectable electronic device to enter a reduced power mode.

In another embodiment of the first aspect, the request is received by the second network-connectable electronic device from the wireless access point, and the method further involves transmitting, in response to determining that transmitting of the keepalive messages should cease, a wake message to the first network-connectable electronic device instructing the first network-connectable electronic device to exit the reduced power mode.

In a second aspect a method is provided. The method involves receiving, at a second network-connectable electronic device, identification (ID) information associated with a first network-connectable electronic device. The method further involves transmitting, from the second network-connectable electronic device, a message to a router. The message includes the ID information associated with the first network-connectable electronic device and is configured to cause the router to keep a network connection associated with the first network-connectable device active.

In an embodiment of the second aspect, the message includes a keepalive message.

In another embodiment of the second aspect, the router includes a wireless access point. The ID information is received over a first radio frequency (RF) channel and the message is transmitted over a second radio frequency (RF) channel different from the first RF channel.

In another embodiment of the second aspect, the first RF channel is a channel that consumes less power than the second RF channel.

In another embodiment of the second aspect, the first RF channel is a 900 megahertz (MHz) channel.

In another embodiment of the second aspect, the first RF channel is a Bluetooth Low Energy (LE) RF channel.

In another embodiment of the second aspect, the first RF channel is a Zigbee RF channel.

In another embodiment of the second aspect, the router includes a wireless access point. The ID information is received over a same radio frequency (RF) channel over which the message is transmitted.

In another embodiment of the second aspect, the router includes a wireless access point. The message is transmitted over a Wi-Fi channel.

In another embodiment of the second aspect, the ID information includes a media access control (MAC) address associated with the first network-connectable electronic device.

In another embodiment of the second aspect, the ID information includes an internet protocol (IP) address associated with the first network-connectable electronic device.

In another embodiment of the second aspect, the IP address is a first IP address and the method further involves receiving, at the second network-connectable electronic device, an IP address reassignment message from the router. The IP address reassignment message includes a second IP address assigned by the router to the first network-connectable electronic device.

In another embodiment of the second aspect, the method further involves transmitting, from the second network-connectable electronic device, the second IP address to the first network connectable electronic device.

In another embodiment of the second aspect, the method further involves transmitting, from the second network-connectable electronic device to the router, the message including the second IP address instead of the first IP address in response to receiving the IP address reassignment message.

In another embodiment of the second aspect, the IP address reassignment message is received at the second network-connectable electronic device after the ID information is received from the first network-connectable electronic device.

In another embodiment of the second aspect, the method further involves receiving, at the second network-connectable electronic device, a request from the router or the first network-connectable electronic device. The method further involves determining based on the request, at the second network-connectable electronic device, that transmission of the message should cease. The method further involves ceasing transmission of messages to the router.

In another embodiment of the second aspect, the request is received from the first network-connectable electronic device.

In another embodiment of the second aspect, the request includes an instruction to cease transmitting the messages.

In another embodiment of the second aspect, the request is received from the router.

In another embodiment of the second aspect, the request includes an instruction that the first network-connectable electronic device begin streaming video to the router.

In another embodiment of the second aspect, the request is a first request and the method further involves transmitting, from the second network-connectable electronic device to the first network-connectable electronic device, a second request including the instruction that the first network-connectable electronic device begin streaming video to the router.

In another embodiment of the second aspect, the request is received by the second network-connectable electronic device from the router, and the method further involves transmitting, in response to determining that transmission of the messages should cease, a wake message to the first network-connectable electronic device instructing the first network-connectable electronic device to exit a reduced power mode.

In another embodiment of the second aspect, the message includes a plurality of messages that are transmitted to the router at least approximately every 0.1 seconds.

In another embodiment of the second aspect, the method further involves transmitting, in response to receiving the ID information of the first network-connectable electronic device, an instruction to the first network-connectable electronic device to cease transmitting messages to the router.

In another embodiment of the second aspect, the instruction further includes a command to the first network-connectable electronic device to enter a reduced power mode.

In a third aspect, a method for maintaining a network connection between a first network-connectable device and a wireless access point is provided. The method involves establishing, by the first network-connectable electronic device, the network connection with the wireless access point. The method further involves determining, by the first network-connectable electronic device, ID information of the first network-connectable electronic device to include in keepalive messages. The keepalive messages are configured to keep the network connection between the wireless access point and the first network-connectable electronic device active. The method further involves transmitting, to a second network-connectable electronic device, the ID information. The method further involves receiving, from the second network-connectable electronic device, an indication that the second network-connectable electronic device will transmit the keepalive messages including the ID information to maintain the network connection. The method further involves entering, by the first network-connectable electronic device, a reduced power mode. The method further involves receiving, by the first network-connectable electronic device, a wakeup signal to exit the reduced power mode. The method further involves reestablishing the network connection with the wireless access point in response to the wakeup signal.

In an embodiment of the third aspect, the method further involves streaming video data to the wireless access point over the network connection after the network connection has been reestablished.

In another embodiment of the third aspect, the method further involves transmitting, by the first network-connectable electronic device, the keepalive messages to the wireless access point after establishing the network connection.

In another embodiment of the third aspect, the method further involves ceasing the transmitting of the keepalive messages after receiving the indication.

In another embodiment of the third aspect, the first network-connectable electronic device enters the reduced power mode in response to receiving the indication.

In another embodiment of the third aspect, the second RF channel is a Wi-Fi channel.

In another embodiment of the third aspect, the first RF channel is a channel that consumes less power than the second RF channel.

In another embodiment of the third aspect, the first RF channel is a 900 megahertz (MHz) channel.

In another embodiment of the third aspect, the first RF channel is a Bluetooth Low Energy (LE) RF channel.

In another embodiment of the third aspect, the first RF channel is a Zigbee RF channel.

In another embodiment of the third aspect, the wakeup signal is received over a first radio frequency (RF) channel and the video data is streamed over a second radio frequency (RF) channel different from the first RF channel.

In another embodiment of the third aspect, the network connection is established over the second RF channel.

In another embodiment of the third aspect, the ID information is transmitted over the first RF channel.

In another embodiment of the third aspect, the indication is received over the first RF channel.

In another embodiment of the third aspect, the wakeup signal further includes a request for video data.

In another embodiment of the third aspect, the wakeup signal is received in response to a user input associated with the first network-connectable electronic device.

In another embodiment of the third aspect, the user input is a button press.

In another embodiment of the third aspect, the ID information includes a media access control (MAC) address associated with the first network-connectable electronic device.

In another embodiment of the third aspect, the ID information includes an internet protocol (IP) address associated with the first network-connectable electronic device.

In another embodiment of the third aspect, the IP address is a first IP address and the method further involves receiving, at the first network-connectable electronic device, an IP address reassignment message from the second network-connectable electronic device. The IP address reassignment message includes a second IP address assigned by the wireless access point to the first network-connectable electronic device. The IP address reassignment message is received at the first network-connectable electronic device over a first radio frequency (RF) channel. The video data is streamed to the wireless access point over a second radio frequency (RF) channel different from the first RF channel.

In another embodiment of the third aspect, during reduced power mode no video data and no keepalive messages are transmitted by the first network-connectable electronic device.

In a fourth aspect, a method is provided. The method involves transmitting, by a first network-connectable electronic device to a second network-connectable electronic device, identification (ID) information associated with the first network-connectable electronic device. The method further involves entering, by the first network-connectable electronic device, a reduced power mode after transmitting the ID information to the second network-connectable electronic device. The method further involves receiving, by the first network-connectable electronic device, a wakeup signal to exit the reduced power mode.

In an embodiment of the fourth aspect, the method further involves establishing a connection between the first network-connectable electronic device and a router prior to transmitting the ID information to the second network-connectable electronic device.

In another embodiment of the fourth aspect, the method further involves receiving, from the second network-connectable electronic device, an indication that the second network-connectable electronic device will transmit messages including the ID information to maintain the network connection.

In another embodiment of the fourth aspect, the first network-connectable electronic device enters the reduced power mode in response to receiving the indication.

In another embodiment of the fourth aspect, the messages include keepalive messages.

In another embodiment of the fourth aspect, the ID information is configured to be included in messages. The messages are configured to keep the network connection between a router and the first network-connectable electronic device active.

In another embodiment of the fourth aspect, the method further involves reestablishing the network connection with a router in response to the wakeup signal.

In another embodiment of the fourth aspect, the method further involves streaming video data to the router over the network connection after the network connection has been reestablished.

In another embodiment of the fourth aspect, the video data is captured by a video camera associated with the first network-connectable electronic device.

In another embodiment of the fourth aspect, the wakeup signal is received from the second network-connectable electronic device.

In another embodiment of the fourth aspect, the router includes a wireless access point, the wakeup signal is received over a first radio frequency (RF) channel, and the video data is streamed over a second radio frequency (RF) channel different from the first RF channel.

In another embodiment of the fourth aspect, the router includes a wireless access point and the network connection is established over the second RF channel.

In another embodiment of the fourth aspect, the router includes a wireless access point and the ID information is transmitted over the first RF channel.

In another embodiment of the fourth aspect, the wakeup signal further includes a request for the video data.

In another embodiment of the fourth aspect, the router includes a wireless access point and the second RF channel is a Wi-Fi channel.

In another embodiment of the fourth aspect, the first RF channel is a channel that consumes less power than the second RF channel.

In another embodiment of the fourth aspect, the first RF channel is a 900 megahertz (MHz) channel.

In another embodiment of the fourth aspect, the first RF channel is a Bluetooth Low Energy (LE) RF channel.

In another embodiment of the fourth aspect, the first RF channel is a Zigbee RF channel.

In another embodiment of the fourth aspect, the method further involves transmitting, by the first network-connectable electronic device, messages to the router after establishing the network connection and before entering the reduced power mode. The messages are configured to cause the router to keep a network connection associated with the first network-connectable device active.

In another embodiment of the fourth aspect, the method further involves ceasing the transmitting of the messages after transmitting the ID information to the second network-connectable electronic device.

In another embodiment of the fourth aspect, the wakeup signal is received in response to a user input associated with the first network-connectable electronic device.

In another embodiment of the fourth aspect, the user input is a button press.

In another embodiment of the fourth aspect, the ID information includes a media access control (MAC) address associated with the first network-connectable electronic device.

In another embodiment of the fourth aspect, the ID information includes an internet protocol (IP) address associated with the first network-connectable electronic device.

In another embodiment of the fourth aspect, the router includes a wireless access point, the IP address is a first IP address, and the method further involves receiving, at the first network-connectable electronic device, an IP address reassignment message from the second network-connectable electronic device. The IP address reassignment message includes a second IP address assigned by the wireless access point to the first network-connectable electronic device. The IP address reassignment message is received at the first network-connectable electronic device over a first radio frequency (RF) channel.

In another embodiment of the fourth aspect, the method further involves streaming, by the first network-connectable electronic device, video data to the wireless access point in response to the wakeup signal over a second radio frequency (RF) channel different from the first RF channel.

In another embodiment of the fourth aspect, during the reduced power mode the first network-connectable device does not transmit any video data nor any messages configured to keep a network connection between the first network-connectable device and a router active.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method for maintaining a network connection between a first network-connectable electronic device and a wireless access point, the method comprising:
    receiving, at a second network-connectable electronic device from the first network-connectable electronic device, identification (ID) information comprising a first internet protocol (IP) address associated with the first network-connectable electronic device, wherein the ID information is received over a first radio frequency (RF) channel;
    transmitting, from the second network-connectable electronic device to the wireless access point over a second RF channel different from the first RF channel, first keepalive messages configured to keep the network connection between the wireless access point and the first network-connectable electronic device active, wherein the first keepalive messages comprise the ID information of the first network-connectable electronic device;
    receiving, at the second network-connectable electronic device, an IP address reassignment message from the wireless access point, wherein the IP address reassignment message comprises a second IP address assigned by the wireless access point to the first network-connectable electronic device;
    transmitting, from the second network-connectable electronic device to the wireless access point over the second RF channel, second keepalive messages comprising the second IP address in response to receiving the IP address reassignment message;
    receiving, at the second network-connectable electronic device, a request from at least one of the wireless access point or the first network-connectable electronic device;
    determining based on the request, at the second network-connectable electronic device, that transmission of the second keepalive messages should cease; and
    ceasing transmission of the second keepalive messages to the wireless access point.

2. The method of claim 1, further comprising transmitting, from the second network-connectable electronic device, the second IP address to the first network connectable electronic device over the first RF channel.

3. The method of claim 1, wherein the request is received from the wireless access point, the request is a first request, and the method further comprises transmitting, to the first network-connectable electronic device, a second request comprising at least some information from the first request.

4. The method of claim 1, wherein the second RF channel is a Wi-Fi channel and the first RF channel is a channel that consumes less power than the second RF channel.

5. The method of claim 4, wherein the first RF channel is a 900 megahertz (MHz) channel, a Bluetooth Low Energy (BLE) RF channel, or a Zigbee RF channel.

6. The method of claim 1, wherein the request is received by the second network-connectable electronic device from the wireless access point, and the method further comprises:
    transmitting, in response to determining that transmitting of the keepalive messages should cease, a wakeup signal to the first network-connectable electronic device instructing the first network-connectable electronic device to exit a reduced power mode.

7. The method of claim 1, wherein the request is a first request and the method further comprises transmitting, from the second network-connectable electronic device to the first network-connectable electronic device, a second request comprising the instruction that the first network-connectable electronic device begin streaming video to the router.

8. The method of claim 1, wherein the request is:
received from the first network-connectable electronic device and the request comprises an instruction to cease transmitting keepalive messages, or
received from the wireless access point and the request comprises an instruction that the first network-connectable electronic device begin streaming video to the wireless access point.

9. A method comprising:
receiving, at a second network-connectable electronic device, identification (ID) information comprising a first internet protocol (IP) address associated with a first network-connectable electronic device;
transmitting, from the second network-connectable electronic device, a first message to a router, wherein the first message comprises the ID information associated with the first network-connectable electronic device and is configured to cause the router to keep a network connection associated with the first network-connectable device active;
receiving, at the second network-connectable electronic device, an IP address reassignment message from the router, wherein the IP address reassignment message comprises a second IP address assigned by the router to the first network-connectable electronic device; and
transmitting, from the second network-connectable electronic device to the router, a second message comprising the second IP address in response to receiving the IP address reassignment message.

10. The method of claim 9, wherein the first message comprises a keepalive message.

11. The method of claim 9, wherein the router comprises a wireless access point, and wherein the ID information is received over a first radio frequency (RF) channel and the first message is transmitted over a second radio frequency (RF) channel different from the first RF channel.

12. The method of claim 11, wherein the second RF channel is a Wi-Fi channel and the first RF channel is a channel that consumes less power than the second RF channel.

13. The method of claim 9, further comprising transmitting, from the second network-connectable electronic device, the second IP address to the first network connectable electronic device.

14. The method of claim 13, wherein:
the IP address reassignment message is received at the second network-connectable electronic device from the router over a first radio frequency (RF) channel; and
the second IP address is transmitted to the first network connectable electronic device from the second network-connectable electronic device over a second radio frequency (RF) channel different from the first RF channel.

15. The method of claim 9, further comprising:
receiving, at the second network-connectable electronic device, a request from the router or the first network-connectable electronic device;
determining based on the request, at the second network-connectable electronic device, that transmission of subsequent keepalive messages should cease; and
ceasing transmission of the subsequent keepalive messages to the router.

16. The method of claim 15, wherein the request is received from the first network-connectable electronic device and the request comprises an instruction to cease transmitting the subsequent keepalive messages.

17. The method of claim 15, wherein the request is received from the router and the request comprises an instruction that the first network-connectable electronic device begin streaming video to the router.

18. The method of claim 17, wherein the request is a first request and the method further comprises transmitting, from the second network-connectable electronic device to the first network-connectable electronic device, a second request comprising the instruction that the first network-connectable electronic device begin streaming video to the router.

19. A method comprising:
receiving, at a second network-connectable electronic device from a first network-connectable electronic device, identification (ID) information comprising a first internet protocol (IP) address associated with the first network-connectable electronic device;
transmitting, from the second network-connectable electronic device to a wireless access point, keepalive messages configured to keep a network connection between the wireless access point and the first network-connectable electronic device active, the transmitting being for a period of time during at least a portion of which the first network-connectable electronic device does not transmit the keepalive messages, wherein the keepalive messages comprise the ID information of the first network-connectable electronic device;
receiving, at the second network-connectable electronic device, an IP address reassignment message from the router, wherein the IP address reassignment message comprises a second IP address assigned by the router to the first network-connectable electronic device; and
transmitting, from the second network-connectable electronic device, the second IP address to the first network connectable electronic device.

20. The method of claim 19, wherein the first network-connectable electronic device is in a reduced power mode while the second network-connectable electronic device is transmitting the keepalive messages.

21. The method of claim 19, further comprising transmitting, from the second network-connectable electronic device to the first network-connectable electronic device, an indication that the second network-connectable electronic device will transmit the keepalive messages to maintain the network connection.

22. The method of claim 19, wherein the ID information is received over a first radio frequency (RF) channel and the keepalive messages are transmitted over a second RF channel different from the first RF channel.

23. The method of claim 19, further comprising ceasing, by the second network-connectable electronic device, transmission of the keepalive messages to the wireless access point upon receiving a request from at least one of the wireless access point or the first network connectable electronic device.

24. The method of claim 19, wherein:
the IP address reassignment message is received at the second network-connectable electronic device from the router over a first radio frequency (RF) channel; and
the second IP address is transmitted to the first network connectable electronic device from the second network-connectable electronic device over a second radio frequency (RF) channel different from the first RF channel.

* * * * *